(12) United States Patent
Le Henaff

(10) Patent No.: US 10,956,732 B2
(45) Date of Patent: Mar. 23, 2021

(54) SYSTEM AND METHOD FOR DETECTING THE AUTHENTICITY OF PRODUCTS

(71) Applicant: Guy Le Henaff, Montreal (CA)

(72) Inventor: Guy Le Henaff, Montreal (CA)

(*) Notice: Subject to any disclaimer, the term of this patent is extended or adjusted under 35 U.S.C. 154(b) by 130 days.

(21) Appl. No.: 15/527,907

(22) PCT Filed: Nov. 23, 2015

(86) PCT No.: PCT/CA2015/051216
§ 371 (c)(1),
(2) Date: May 18, 2017

(87) PCT Pub. No.: WO2016/077934
PCT Pub. Date: May 26, 2016

(65) Prior Publication Data
US 2018/0349695 A1 Dec. 6, 2018

Related U.S. Application Data

(60) Provisional application No. 62/082,939, filed on Nov. 21, 2014.

(51) Int. Cl.
*G06K 9/60* (2006.01)
*G06K 9/00* (2006.01)
(Continued)

(52) U.S. Cl.
CPC ....... *G06K 9/00577* (2013.01); *G06F 16/583* (2019.01); *G06K 9/00* (2013.01);
(Continued)

(58) Field of Classification Search
CPC .... G06K 9/00577; G06K 9/00; G06K 9/2063; G06K 9/3233; G06K 9/6201;
(Continued)

(56) References Cited

U.S. PATENT DOCUMENTS 5,267,332 A 11/1993 Walch et al.
5,673,338 A * 9/1997 Denenberg ........... G06K 9/3233
382/209

(Continued)

FOREIGN PATENT DOCUMENTS

CN 102576394 7/2012
CN 103310256 9/2013
(Continued)

OTHER PUBLICATIONS

Secure fragile watermarking-capabilities, Sergio Bravo-Solorio et al., Elsevier, 2011, pp. 728-739 (Year: 2011).*
(Continued)

*Primary Examiner* — Jayesh A Patel
(74) *Attorney, Agent, or Firm* — Hamre, Shcumann, Mueller & Larson, P.C.

(57) ABSTRACT

System and method for detecting the authenticity of products by detecting a unique chaotic signature. Photos of the products are taken at the plant and stored in a database/server. The server processes the images to detect for each authentic product a unique authentic signature which is the result of a manufacturing process, a process of nature etc. To detect whether the product is genuine or not at the store, the user/buyer may take a picture of the product and send it to the server (e.g. using an app installed on a portable device or the like). Upon receipt of the photo, the server may process the receive image in search for a pre-detected and/or pre-stored chaotic signature associated with an authentic product. The server may return a response to the user indicating the result of the search. A feedback mechanism may be included to guide the user to take a picture at a specific location of the product where the chaotic signature may exist.

26 Claims, 16 Drawing Sheets

US 10,956,732 B2
Page 2

(51) Int. Cl.
| | |
|---|---|
| *G06F 16/583* | (2019.01) |
| *G06K 9/20* | (2006.01) |
| *G06T 5/40* | (2006.01) |
| *G06T 7/44* | (2017.01) |
| *G06T 5/00* | (2006.01) |
| *G06T 7/42* | (2017.01) |
| *G06T 7/70* | (2017.01) |
| *G06K 9/32* | (2006.01) |
| *G06K 9/62* | (2006.01) |
| *G06K 19/06* | (2006.01) |
| *G06T 7/00* | (2017.01) |

(52) U.S. Cl.
CPC ......... *G06K 9/2063* (2013.01); *G06K 9/3233* (2013.01); *G06K 9/6201* (2013.01); *G06K 19/06037* (2013.01); *G06T 5/006* (2013.01); *G06T 5/40* (2013.01); *G06T 7/0002* (2013.01); *G06T 7/42* (2017.01); *G06T 7/44* (2017.01); *G06T 7/70* (2017.01); *G06K 2009/0059* (2013.01); *G06K 2209/25* (2013.01); *G06T 2207/20061* (2013.01); *G06T 2207/20064* (2013.01); *G06T 2207/20076* (2013.01)

(58) Field of Classification Search
CPC ..... G06K 19/06037; G06K 2009/0059; G06K 2209/25; G06T 7/0002; G06T 2207/20076
See application file for complete search history.

(56) References Cited

U.S. PATENT DOCUMENTS

| | | | | |
|---|---|---|---|---|
| 6,101,265 A | * | 8/2000 | Bacus | G01N 15/1475 345/665 |
| 6,396,507 B1 | * | 5/2002 | Kaizuka | G06T 3/0025 345/660 |
| 7,443,508 B1 | * | 10/2008 | Vrhel | G01J 3/10 348/195 |
| 7,891,565 B2 | * | 2/2011 | Pinchen | G06K 19/086 235/385 |
| 8,027,509 B2 | * | 9/2011 | Reed | G06T 1/0042 382/100 |
| 8,090,952 B2 | * | 1/2012 | Harris | H04L 9/001 713/176 |
| 8,171,567 B1 | * | 5/2012 | Fraser | G06F 21/64 726/32 |
| 8,731,301 B1 | * | 5/2014 | Bushman | G06K 9/00671 382/189 |
| 8,908,980 B2 | * | 12/2014 | Hong | H04N 19/124 382/233 |
| 8,989,500 B2 | * | 3/2015 | Boutant | G06K 9/00577 382/190 |
| 9,208,394 B2 | * | 12/2015 | Di Venuto Dayer | G06K 9/6857 |
| 9,269,022 B2 | * | 2/2016 | Rhoads | G06F 16/583 |
| 9,401,153 B2 | * | 7/2016 | Sharma | G10L 19/018 |
| 9,800,360 B2 | * | 10/2017 | Yamada | H04H 60/80 |
| 9,947,015 B1 | * | 4/2018 | Vildosola | G06Q 30/0185 |
| 10,482,471 B2 | * | 11/2019 | Herrington | G06Q 30/018 |
| 2002/0025084 A1 | * | 2/2002 | Yang | H04N 1/3875 382/299 |
| 2003/0174863 A1 | * | 9/2003 | Brundage | B42D 25/29 382/100 |
| 2004/0001604 A1 | * | 1/2004 | Amidror | G07D 7/0032 382/100 |
| 2004/0068170 A1 | * | 4/2004 | Wang | A61B 8/465 600/407 |
| 2004/0258274 A1 | * | 12/2004 | Brundage | G07D 7/128 382/100 |
| 2006/0013464 A1 | * | 1/2006 | Ramsay | G06K 9/36 382/132 |
| 2006/0013486 A1 | * | 1/2006 | Burns | G06T 7/001 382/195 |
| 2006/0100964 A1 | | 5/2006 | Wilde et al. | |
| 2006/0290136 A1 | * | 12/2006 | Alasia | G07D 7/128 283/72 |
| 2007/0150829 A1 | * | 6/2007 | Eschbach | G06F 40/103 715/781 |
| 2007/0158434 A1 | * | 7/2007 | Fan | H04N 1/32144 235/487 |
| 2007/0274585 A1 | * | 11/2007 | Zhang | G06F 19/321 382/132 |
| 2007/0292034 A1 | * | 12/2007 | Tabankin | H04N 5/232 382/232 |
| 2008/0095465 A1 | * | 4/2008 | Mullick | G06T 7/35 382/284 |
| 2008/0201305 A1 | * | 8/2008 | Fitzpatrick | G06Q 30/02 |
| 2008/0219503 A1 | * | 9/2008 | Di Venuto | G06K 9/6857 382/103 |
| 2008/0310765 A1 | * | 12/2008 | Reichenbach | G06K 7/1443 382/312 |
| 2009/0080695 A1 | * | 3/2009 | Yang | G06K 9/3241 382/103 |
| 2009/0302101 A1 | * | 12/2009 | Poizat | G06K 9/00577 235/375 |
| 2010/0067691 A1 | * | 3/2010 | Lin | H04L 9/3247 380/55 |
| 2010/0128964 A1 | * | 5/2010 | Blair | G06K 9/2027 382/135 |
| 2010/0195894 A1 | * | 8/2010 | Lohweg | G07D 7/2016 382/135 |
| 2010/0296583 A1 | * | 11/2010 | Li | H04N 19/162 375/240.24 |
| 2011/0007935 A1 | * | 1/2011 | Reed | H04N 1/32309 382/100 |
| 2011/0135160 A1 | * | 6/2011 | Sagan | G07D 7/12 382/108 |
| 2011/0142302 A1 | * | 6/2011 | Leung | G06T 1/005 382/128 |
| 2012/0104097 A1 | * | 5/2012 | Moran | G06K 19/06037 235/449 |
| 2013/0142440 A1 | * | 6/2013 | Hirayama | B42D 25/305 382/212 |
| 2013/0173383 A1 | | 7/2013 | Sharma et al. | |
| 2013/0287267 A1 | * | 10/2013 | Varone | G06K 19/18 382/115 |
| 2014/0006101 A1 | * | 1/2014 | Andrade | G06Q 30/02 705/7.29 |
| 2014/0037129 A1 | * | 2/2014 | Reed | G06K 9/00 382/100 |
| 2014/0147046 A1 | * | 5/2014 | Massicot | G07D 7/128 382/182 |
| 2014/0185882 A1 | * | 7/2014 | Masuura | H04N 5/23267 382/107 |
| 2014/0201094 A1 | * | 7/2014 | Herrington | G06Q 30/018 705/317 |
| 2014/0304122 A1 | * | 10/2014 | Rhoads | G06T 19/006 705/27.2 |
| 2014/0341374 A1 | * | 11/2014 | Thozhuvanoor | H04L 9/0869 380/28 |
| 2015/0310601 A1 | * | 10/2015 | Rodriguez | G07G 1/0072 348/150 |
| 2016/0055398 A1 | * | 2/2016 | Ishiyama | G06K 9/036 382/190 |
| 2016/0063302 A1 | * | 3/2016 | Doerr | G06K 9/0053 382/154 |
| 2016/0071101 A1 | * | 3/2016 | Winarski | G06Q 20/3829 705/71 |
| 2016/0140420 A1 | * | 5/2016 | Di Venuto Dayer, V | G06K 9/00577 382/103 |
| 2016/0171744 A1 | * | 6/2016 | Rhoads | G06K 9/6255 345/419 |
| 2016/0259947 A1 | * | 9/2016 | Negrea | G06F 21/31 |
| 2016/0259976 A1 | * | 9/2016 | Halasz | G06K 19/086 |

(56) References Cited

U.S. PATENT DOCUMENTS

2016/0321531 A1* 11/2016 Lau .................. G06K 19/06103
2018/0107915 A1*  4/2018 Toedtli ............. G06K 19/06028
2020/0027106 A1*  1/2020 Kendrick ............. G06K 9/6201

FOREIGN PATENT DOCUMENTS

| CN | 103702217 | 4/2014 | | |
|---|---|---|---|---|
| CN | 104123537 | 10/2014 | | |
| GB | 2464723 | 4/2010 | | |
| WO | 2013173408 | 11/2013 | | |
| WO | WO-2013173408 A1 * | 11/2013 | ........... | G06K 9/3216 |
| WO | 2013191281 | 12/2013 | | |
| WO | WO-2013191281 A1 * | 12/2013 | ............... | H04N 7/18 |

OTHER PUBLICATIONS

International Search Report issued in International Application No. PCT/CA2015/051216 dated Mar. 1, 2016 (5 pages).
Written Opinion issued in International Application No. PCT/CA2015/051216 dated Mar. 1, 2016 (6 pages).
Supplementary European Search Report issued in European Application No. 15860424.9 dated Mar. 19, 2018 (19 pages).
"Template Matching"; Wikipedia, XP055433175, 2014, Retrieved from the Internet, https://en.wikipedia.org/w/index.php?title=Template_matching&oldid=615694604. (6 pages).
Wiegand et al.: "Motion Estimation for Video Coding", 2012, XP055433170, Retrieved from the Internet, https://web.stanford.edu/class/ee398a/handouts/lectures/EE398a_MotionEstimation_2012. (33 pages).
European Search Report issued in European Application No. 15860424 dated Dec. 19, 2017 (18 pages).
"Template Matching"; Wikipedia, XP055433175, 2014, 6 pages, retrieved from the Internet, https://en.wikipedia.org/w/index.php?title=Template_matching&oldid=615694604.
Wiegand et al.: "Motion Estimation for Video Coding"; 2012, 33 pages, Retrieved from the Internet: https://web.stanford.edu/class/ee398a/handouts/lectures/EE398a_MotionEstimation_2012.pdf.
Qiu Chen et al., "A Modified Way of Image Matching Based on Grid Searching," Image Processing and Multimedia Technology, 2009, pp. 56-60.
First Office Action and Search Report issued for Chinese Patent Application No. 201580074242.8, dated Mar. 19, 2020, 38 pages including English translation of the Office Action.

* cited by examiner

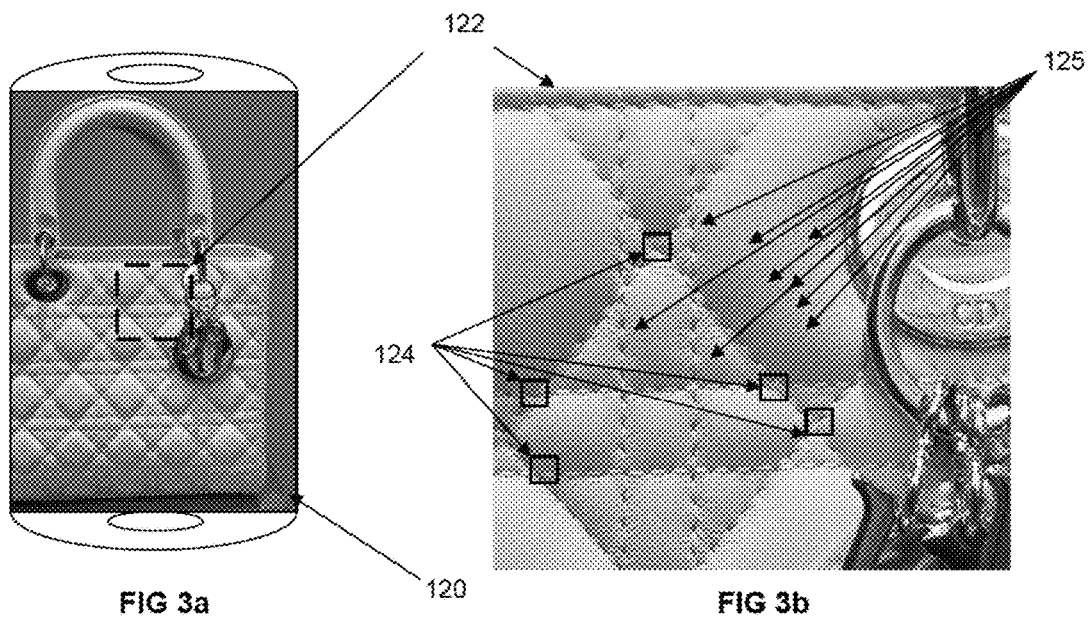
FIG 3a
FIG 3b
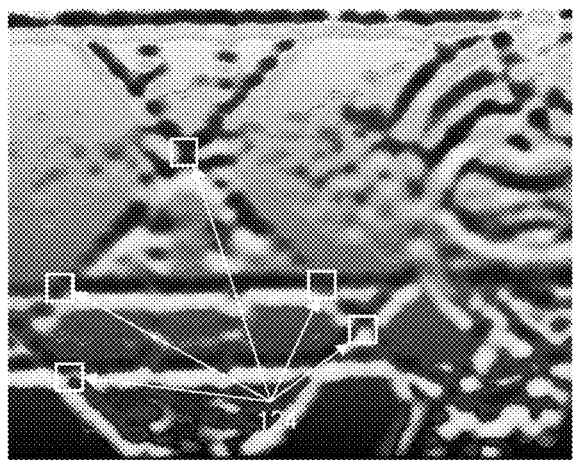
FIG 3c
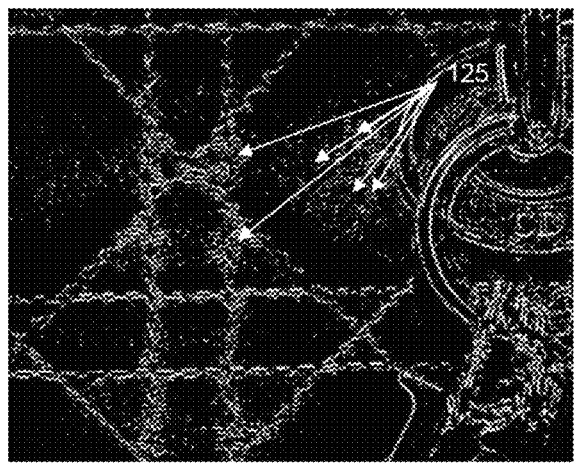
FIG 3d

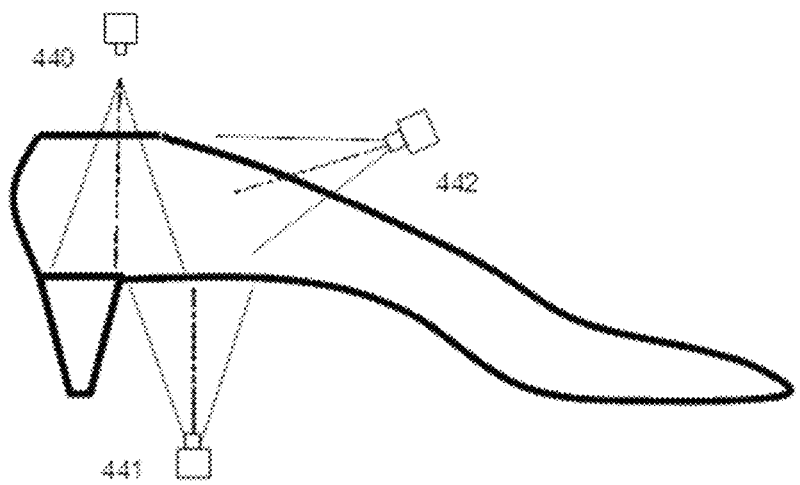
FIG 4a
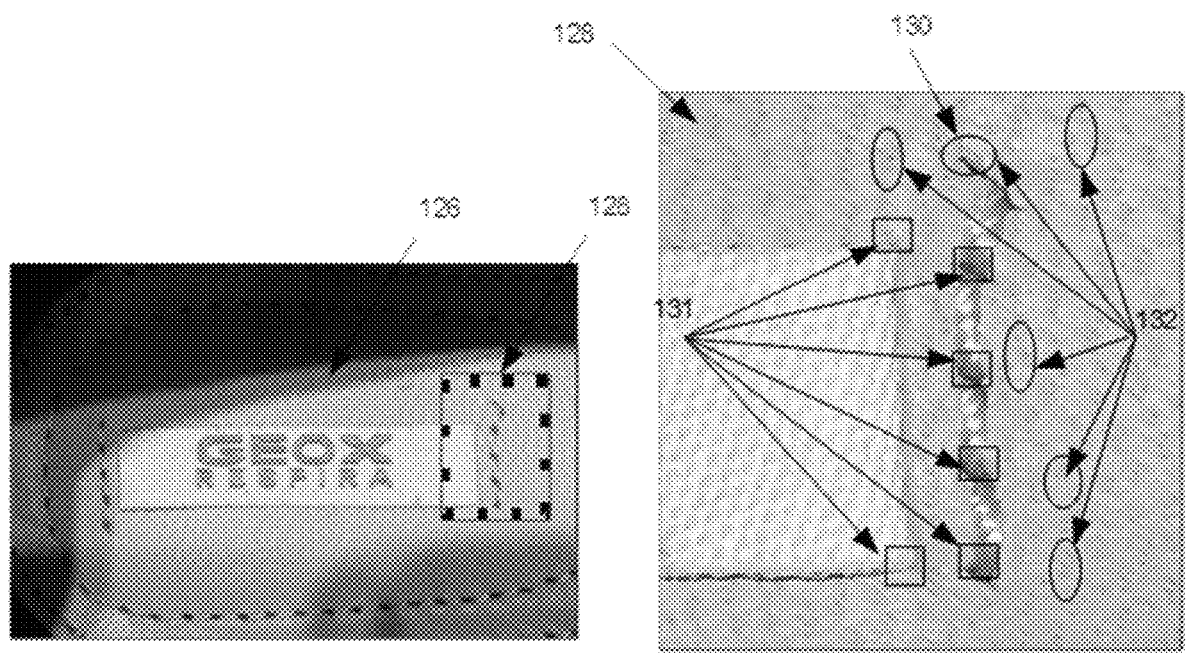
FIG 4b
FIG 4c

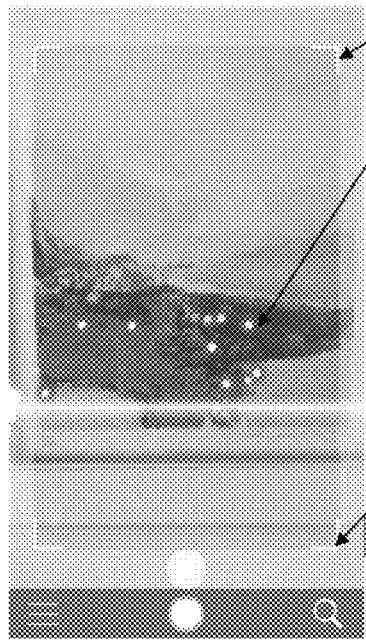
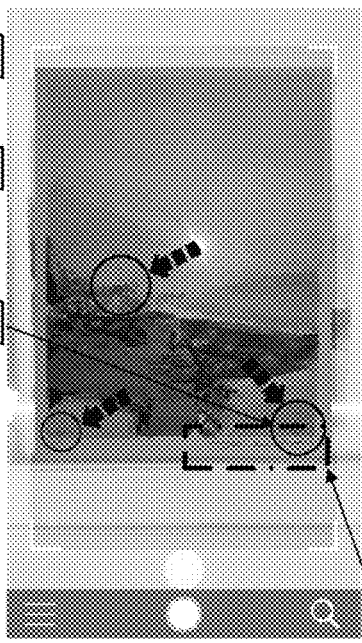
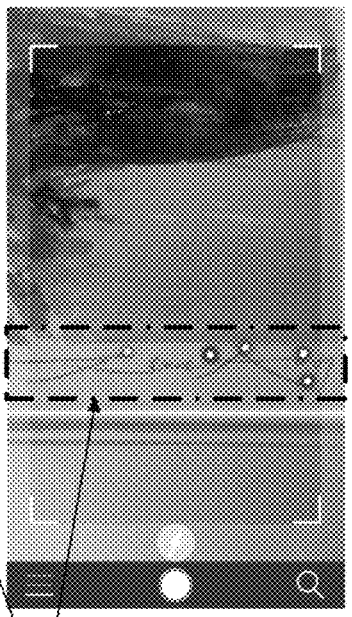
FIG 12    FIG 13    FIG 15
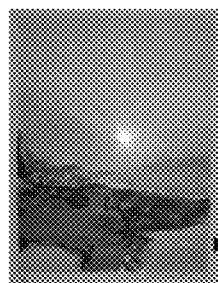
FIG 14
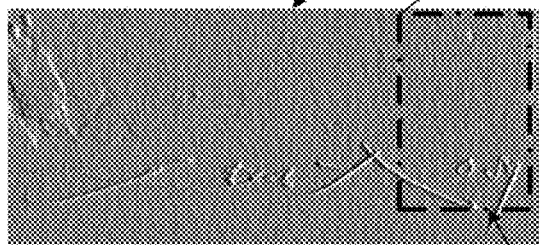
FIG 16
FIG 17

SYSTEM AND METHOD FOR DETECTING THE AUTHENTICITY OF PRODUCTS

RELATED APPLICATIONS

This application claims priority from U.S. Provisional Application No. 62/082,939 filed on Nov. 21, 2014, the specification of which is incorporated herein by reference in its entirety.

BACKGROUND

(a) Field

The subject matter disclosed generally relates to systems and methods for detecting the authenticity of products. In particular, the subject matter relates to a system and method for uniquely identifying items so as to be able to distinguish genuine items from counterfeit items.

(b) Related Prior Art

Counterfeiting is a hugely lucrative business in which criminals rely on the continued high demand for cheap goods coupled with low production and distribution costs.

Counterfeiting of items such as luxury goods, food, alcoholic beverages, materials, art work (paintings, sculpture), drugs and documents defrauds consumers and tarnishes the brand names of legitimate manufacturers and providers of the genuine items. Additionally, the counterfeit items can often endanger the public health (for example, when adulterated foods and drugs are passed off as genuine).

The Organization for Economic Cooperation and Development (OECD) estimated the value of counterfeiting to be in the region of $800 billion per year worldwide, including 250 billion in drugs and medical. This imposes a real burden on world trade estimated to 2% of world trade for 2007.

Anti-counterfeiting measures have included serial numbers, machine readable identifiers (e.g., barcodes and two-dimensional codes), "tamper-proof" security labels (e.g., holograms and labels that change state or partly or completely self-destruct on removal), and remotely detectable tags (e.g., radio-frequency identification tags) applied to items directly or to tags, labels, and/or packaging for such items. The principle behind the most common approach is to try to increase the difficulties to reproduce a specific item/tag/object affixed on the goods being purchased.

However, such measures have themselves been counterfeited.

Some methods exist which affix an additional label that contains some sort of signature of a non-reproducible material, in the form of a hologram or in the form of grains of certain colors (like Stealth Mark). Some other methods exist which heat up a polymer to create a bubble to purposely introduce a chaotic pattern.

Therefore, there remains a need in the market for a more secure system and method for detecting the authenticity of the products being purchased.

SUMMARY

The present embodiments describe such system and method.

As discussed above, existing approaches aim at affixing a controlled material of a certain aspect onto some hard surface of the product to allow for a simple signature detection when looked at through a magnifying lens (which in fact requires adding this lens to the capturing device and also requires the user to know where to check for the signature part of the product). However, natural chaos of matter already exists in most of the product categories that need authentication, which is the fundamental concept behind human fingerprint. Accordingly, the embodiments aim at capturing the existing natural chaos and dealing with the difficulties that exist to generalize the process when the end user is either not expecting to see any addition of material (Art, luxury) or increase in cost (Drug manufacturing).

Accordingly, a method is described which allows for detecting the natural chaos and aggregating analysis from various areas of the product (hard or soft (flexible)) using only photos captured by portable computing devices. In more simplified words, the identification process acts as a method for detecting a unique and chaotic virtual serial number, as well as a way for confirming existence or non-existence of the virtual serial number.

In a non-limiting example of implementation, a user-guided method is described which allows for a powerful algorithm to be use, which algorithm, allows for a guided progressive elimination/decimation of suspicion to enable a vision-based authentication system that serves the purpose. In other words, a fingerprint authentication system is exemplified which is generalized to cover natural chaos in products and goods. The system does not always allow for a simultaneous identification but may require first to know where to search for the fingerprint.

In an aspect, there is provided a method for determining the authenticity of products, the method comprising: using an image capturing device, capturing images of authentic products; processing the captured images including detecting, for each authentic product, a unique chaotic signature in one or more images associated with that authentic product; receiving, from a remote computing device, an authenticity request for a given product, the authenticity request comprising an image of the given product; performing a search for a pre-detected chaotic signature associated with one of the authentic products, within the received image of the given product; and determining the authenticity of the given product based on a result of the search.

In another aspect, there is provided a method for determining the authenticity of products, the method comprising receiving captured images of authentic products; processing the captured images including detecting, for each authentic product, a unique chaotic signature in one or more images associated with that authentic product; receiving, from a remote computing device, an authenticity request for a given product, the authenticity request comprising an image of the given product; performing a search for a pre-detected chaotic signature associated with one of the authentic products searching within the received image of the given product; and determining the authenticity of the given product based on a result of the search.

In a further aspect, there is provided a memory device having recorded thereon non-transitory computer readable instructions for determining the authenticity of products; the instructions when executed by a processor cause the processor to process images of authentic products including detecting, for each authentic product, a unique chaotic signature in one or more images associated with that authentic product; receive, from a remote computing device, an authenticity request for a given product, the authenticity request comprising an image of the given product; search for a pre-detected chaotic signature associated with one of the authentic products within the received image; and determine the authenticity of the given product based on a result of the search.

In yet a further aspect, there is provided a computing device having access to a memory having recorded thereon computer readable code for determining the authenticity of products, the code when executed by the processor of the computing device causes the computing device to process images of authentic products including detecting, for each authentic product, a unique chaotic signature in one or more images associated with that authentic product; receive, from a remote computing device, an authenticity request for a given product, the authenticity request comprising an image of the given product; search for a pre-detected chaotic signature associated with one of the authentic products within the received image; and determine the authenticity of the given product based on a result of the search.

In yet another aspect, there is provided a memory device having recorded thereon non-transitory computer readable instructions for installing on a portable computing device comprising an image capturing device, the instructions when executed by a processor causes the computing device to: capture an image of a given product; send the image of the given product to a remote server for verification; receive from the remote server a request to take a close-up image of the given product, and location information identifying a region of interest (ROI) for the close-up image; identify the location of the ROI on the given product; display a visual indicator of the ROI on a display device associated with the computing device to allow a user to zoom over the ROI and take the close-up picture.

In yet another aspect, there is provided a memory device having recorded thereon non-transitory computer readable instructions for installing on a computing device, the computer readable instructions comprising: images of authentic products, each image comprising a chaotic signature which is specific to an authentic product, and/or data representing the chaotic signatures associated with the authentic products; and executable instructions which when executed by the computing device cause the computing device to: capture or receive a first image of a first product; process the first image to determine an authenticity of the first product, wherein processing of the first image comprises detecting a presence or lack of presence of a pre-recorded chaotic signature in the first image.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIG. 3a illustrates an example of an image taken at the authentication phase on a Smartphone;

FIG. 3b is dose up view of an ROI region in FIG. 3a;

FIG. 3c is an image transform of the image of FIG. 3b using a gradient over a low pass filtered image, in accordance with a non-limiting example of implementation;

FIG. 3d show a high pass filtering of the image of FIG. 3b once luminance had been neutralized;

FIGS. 4a to 4c illustrate images of a different product;

FIGS. 12 to 29 illustrate different methods for determining the ROI on different products;

FIGS. 30-1 to 30-4 illustrate an example of a method for determining the authenticity of a product by progressively detecting a lattice defining a web comprising a plurality of paths in an image;

It will be noted that throughout the appended drawings, like features are identified by like reference numerals.

DETAILED DESCRIPTION

Figure 1:
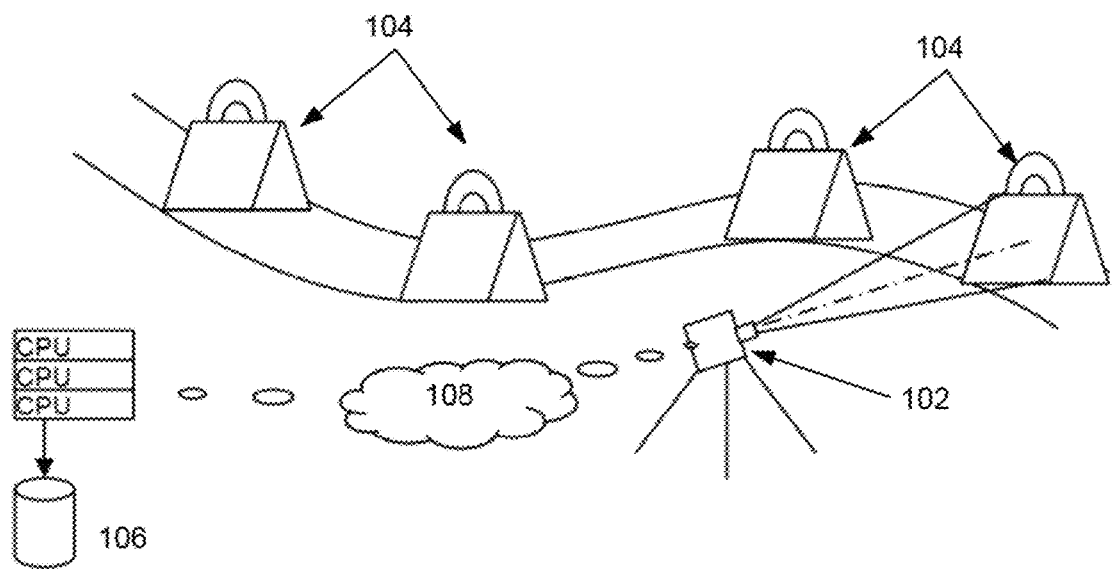
FIG. 1 describes an example of the production registration phase in accordance with an embodiment.

Embodiments of the invention describe a system and method for detecting the authenticity of products by detecting a unique chaotic signature that should be intimately part of the product itself. As a non-limiting example, leather pore, fiber in Xray of metal goods, wood, fiber in paper. Photos of the products are taken at the plant and stored in a database/server which is accessible via a telecommunications network. The server processes the images to detect for each authentic product a unique authentic signature which is the result of a manufacturing process or a process of nature or any other process that may leave a unique signature that can be used as a unique identification of the product. To detect whether the product is genuine or not at the store, the user may take a picture of the product and send it to the server (e.g. using an app installed on a portable device or the like). Upon receipt of the photo, the server may process the receive image in search for a pre-detected and/or pre-stored chaotic signature associated with an authentic product. The server may return a response to the user indicating the result of the search. A feedback mechanism may be included to guide the user to take a picture at a specific location of the product where the chaotic signature may exist.

The authentication method may include three main phases: 1) a product registration phase which usually occurs at the plant where the genuine products are manufactured, whereby, images of the genuine products are taken and stored. 2) The second phase is the verification request phase which occurs at the store where the product is being sold, whereby, a user who wants to check the authenticity of a given product may take a picture of the product and send the picture to the server for verification. This phase can involve an Augmented Reality experience in order to guide the user toward an area of the product that are best suited for authentication (and which include one or more ROIs as described below). 3) The third phase is the comparison phase whereby the server compares the received image with pre-stored images of genuine products and outputs the comparison results for viewing on the user's computing device.

Phase 2) may involve three sub-phases: Phase 2.1) performs an identification of the product, phase 2.2) is a dialogue between the system and the user based on phase 2.1 to guide user toward a Zone Of Authentication (aka Region of Interest ROI) as (122), (128), (154) (156), (1041), (2012) for dose range capture for capturing an image with sufficient resolution for the identification process. Phase 2.3) comprises capturing of the dose range image if determined to be wide enough within acceptable tolerance for slant and rotation (a purified Current Transformation Matrix ($x'=a \times x + c \times y + e$  $y'=b \times x + d \times y + f$, where a, b, c, and d express a traditional rotation matrix with a zoom coefficient and e, f translation) with "a" and "d" coefficient equal and "e and "b" coefficient dose to zero) "e" and "f" coefficient being as expected for targeting the ROI. Sub Phase 2.3 may be performed automatically by the app when the portable device detects that a sufficient resolution of the ROI has been reached (sufficient increase in size and/or number of pixels).

The third phase includes reporting to the user the result of the search. This phase performs the authentication, working on high precision analysis. The result can be done by aggregation of probability of analysis either of various methods applied to same image or of various attempts to authenticate from different views of same object as it can be seen in FIG. 13. For example three probabilities of 50% for three different ROI can result in a pretty high combined probability that a positive match has occurred confirming the authenticity of the product. A Neyman-Pearson lemma algorithm allows to calculate the final probability using all probabilities and their associated qualities. The main embodiment may report the final probability as a bar graph. If the report delivers a probability that is beyond doubt then the display is an OK message, otherwise the result takes the form of a bar from red to green allowing the user to evaluate if they need another method of authentication or to restart the analysis in better environmental condition (generally due to lighting)

It must be noted that the $2^{nd}$ phase may be done with a repetition of image pickup and analysis if a doubtful condition is determined by the machine or if the product does not have sufficient chaotic aspect on a single place (single ROI). This is exemplified on the case of a bag shown in FIGS. 8B and 8D which show two different requests for a close range pickup allowing top aggregate probability out of the authentication process.

Referring now to the drawings, FIG. 1 describes an example of the production registration phase in accordance with an embodiment. In the present example, the product registration phase is exemplified as being a plant for manufacturing luxury bags. As shown in FIG. 1 an image capturing device 102 is operably installed to take photos of the bags 104 as the bags 104 pass down the production chain. Pictures of the bags are stored on a database/server 106 which is accessible via a communications network 108.

The image capturing device 102 can, without limitation, be a smartphone equipped with a good quality camera and a direct telecommunication system a WiFi, Bluetooth or internet enabled camera or any camera with wired or wireless remote transmission capabilities.

Figure 2:
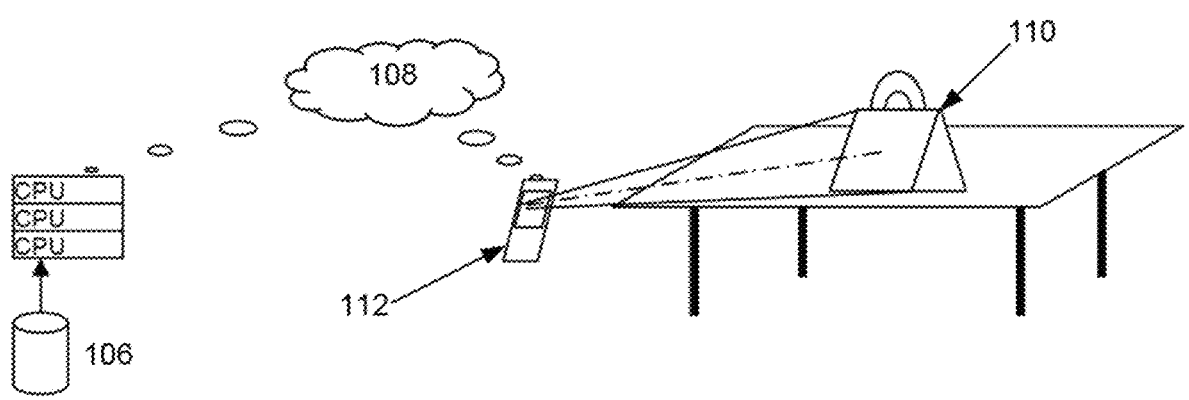
FIG. 2 illustrates an example of the verification request phase, in accordance with an embodiment.

FIG. 2 illustrates an example of the verification request phase, in accordance with an embodiment. As shown in FIG. 2, when the user wants to verify the authenticity of a given product 110, the user may take a picture of the product 110 using a portable computing device 112 and send the picture of the telecommunications network 108 to the server 106 for comparison.

In an embodiment, an application may be provided for installing on the portable computing device 112 for taking a picture of the product 110 and sending the picture to the server 106. The application may include the IP address of the server and may be configured to transmit the picture to the server once the picture is taken. The application may also be configured to perform local image processing and compressing before sending the image to the server 106. In another embodiment, the application may include an interactive aspect to interact with the user and ask for additional pictures in specific areas of the product to improve the analysis. This will be described in further detail herein below.

Image Processing and Search at the Server

Once the image is locally processed and/or compressed it is sent to the server for further processing and comparison with pictures of genuine products.

In an embodiment, the server 106 may be configured to locally process the image of a genuine product taken in the product registration phase to determine one or a plurality of region of interests (ROI) within the image these ROI includes a potential chaotic signature. The embodiments describe a non-limiting example of an image processing method for the sake of illustration and understanding. However, the embodiments are not limited to this method and may be implemented with other image processing methods or a combination of the method described herein and other methods. The region of interest may be chosen based on an increased frequency in a given area as compared to the rest of the image. In an embodiment, three histograms of frequencies may be used: a global 2D, a vertical 1D, and a 1D horizontal histogram of frequencies. A search is done on peak and valley of frequencies to find all relative peaks in the frequency range $\frac{1}{500}$ of image dimension to $\frac{1}{2000}$ of image dimension. Search uses a Kalman filtering of the histogram then extracts differences in the range of an adjusted percentage of the difference between peaks and valleys, for example 30% is an acceptable range. Accordingly a signal that drops less than 30% between two relative maximums will disqualify the two relative maximums as being peaks. This determines the coordinates of area of interest where a certain regularity exists (high pass filter) but where the higher frequencies exhibits irregularities without being in the range of the noise of the image or the surface of the good/product at registration time (typically in a 2 pixels range).

When more than one product is available, the apparatus may use a succession of operation to find commonality between images. This is done by looking for a medium frequency. The server may use a Hough transform to adjust orientation of the object and adjust scale. For example, without limitation it is possible to focus on the label of the product, the stitches, and other areas where a unique signature may be present. Without being mandatory, this helps the asserting recognition of chaos in ROI which give a safer determination of the identity of chaos in respective Area of interests (ROI) as well as giving a first set of clue as the image processing parameters to use for the signing part analysis as it allows the analysis of chaos to work closer to a confirmation mode than an estimation mode. In particular the relative positioning to anchor point. This allows for a simpler identification of relation between sub areas of the image that exhibit at least some signing capabilities. The other interest of such rough common analysis is to determine a minimal feature set that should appear. This is crucial to allow a better determination of cases where the system will assert that it cannot be said that the object is a genuine one, but without reporting it by negation as being not genuine. It is then said as Undetectable.

The single or multiple ROIs are characterized by a higher frequency than the Anchor points, a noise estimation is done first to determine the noise dispersion and the signal/noise ratio. This allows to determine a cut off frequency for frequencies of interest. The interesting areas for ROI are characterized by a high contrast of frequency on relatively wide area (4 to 8 time the pixel distance of the low frequency). All areas that exhibit such pattern of frequencies are grouped by connectivity and create a Mask of the ROI. The values used in the mask reveal the contrast for the surrounding neighbor. This allow for weighting the quality of the authentication that can be done on the ROI at a later stage. In an embodiment, the Mask is computed on every object individually then an intersection of every Mask or ROI is done. The intersection of the Mask takes the form of an addition of contrast. Additionally the first Mask for a first object can profitably be enriched from experience learned from computation of other new objects as they arrive without requiring to re-compute it for all others. This Mask has the higher value where the contrast is not only rather high but also very common. This creates a mix of commonality of the ROI with also the characteristics of it. This Mask is a key component to know where to consider ROIs in scan that will occur during the image analysis in real time. The apparatus focuses its search on areas where the Mask or ROI is high, gradually suggesting areas where the mask have lower and lower values. Each degree or recognition found for each ROI are considered in a final result, each can be weighted with different factor to aggregate their similarity in a consistent manner. Under a certain threshold value (typically Number of Object*3% of contrast swing) the Mask areas of no interest are nullified to avoid a scan of ROI on areas that definitively have no reason to show similarity. So that when the object is not genuine and all previous ROI scan failed individually or by cumulated weighted aggregation to deliver an acceptable combined probability of similarity, the system can determine that the product is not genuine.

In some cases, the location of the ROI may be substantially the same for all products in a given product line. For example, if the highest chaotic signature is around the location of button on the bag due the fact that the button is installed manually, then the location of the ROI may be substantially the same for all the products in this series, and these cases are faster to search since the server does not have to search in other locations when the image is received from the user. However, in most cases the location of the ROI of choice or set or ROIs are different for each product of the same series depending on where the server finds the chaotic signature. As the Mask contains local information about frequency contrast in an area or interest it is of interest to consider an histogram of the Mask itself as well as an histogram of Mask frequencies allowing to characterize a factor based on ratio of medium frequencies versus all others, that allow evaluation of the capabilities the apparatus have to determine signature using only one area or need to aggregate over a couple of others. The more narrow is the frequency histogram, the more a specific area is good place to find signing chaotic pattern.

FIG. 3a illustrates an example of an image taken at the registration phase. The exemplary image 120 represents a hand bag. The server 106 may process the image 120 as discussed above to determine a ROI 122 which includes the chaotic signature. FIG. 3b is close up view of the ROI region 122 in FIG. 3a. As shown in FIG. 3b, the region 122 includes a plurality of irregularities that can be used as anchor points 124 as compared to the rest of the areas. The other irregularities shown are identified as 125 and these constitute the features set. The difference between anchor points and features set is that the anchor points exist in all the products in a given line of products while the features set 125 constitute the chaotic signature and may be the result of a natural process, a manufacturing process, or a natural evolution once a manufacturing process is done, like a fermentation process of mildew that will have its own chaotic structure and can worn out a copy of this structure as a worn out on a material too smooth to be analyzed, or any combination of the above.

FIG. 3c Is an image transform of the image 122 using a low pass filtered image using a pixels level adjustment using a local luminance around each pixels weighting an image gradient over this pixels. On such image a Hough transform is applied that allow to search for major line in Hough space that intersect. Such crossing is considered as anchor point and the quality of such crossing of Hough line is increased when regularly found over other sampled of production goods when they exhibit same crossing in nearly same vicinities. FIG. 3d show a high pass filtering of the image 122 once luminance had been neutralized, another Hough transform allow to search for commonality of lines but in this case it is the complementary that are taken in account as the feature set of chaotic points that will be metered between them, or more generally to an anchor point. This only exemplify a method for analyzing irregularities over goods that qualify a signature, But other method can be used either statistical analysis and classification or non-parametric classification of pattern, that allow at later time a simpler search. Other Examples are Provided Below.

For example, FIG. 4a illustrates an image of another product. There is at least 3 directions of view that allow to take a picture allowing authentication. Direction 440 is typically used during the sale process and exemplified in FIGS. 4b and 4c. Direction 441 is aimed toward another area of the product where sufficient chaotic aspect exists in a place that is expected to be worn out less easily during the life of a product. This can even be used for analyzing passage of person either with a camera looking upward (provided that focus plane and image pre-processing respects people's privacy). It can even be used sideway using the grain of the leather as a signature. The image 126 shown in FIG. 4b includes an area 128 which is rich with irregularities. When processing the image 126, the server would identify the area 128 as a ROI which includes the chaotic signature. FIG. 4b is a close up view of the ROI 128 of FIG. 4a. As shown in FIG. 4b, the ROI 128 includes Anchor points 131. These Anchor points are determined as features which exist across production (de facto if not existing it should warn a trigger that product is defective), the other set involving more chaotic pattern is made of at least a few of the leather pores 132 that are amongst several chaotic aspects including the cut 130 made in the fabric.

Combined, these irregularities define a chaotic signature which is unique to the product associated with that picture. Such chaotic signature constitutes a unique identification aspect which is impossible to forge reproduce, let alone to detect where the chaotic signature exists on the product. The signature may be strengthened further by creating relationships between the different chaotic aspects such as but not limited to: number of chaotic aspects, distance between a certain chaotic aspect and another one etc.

Figure 5A:
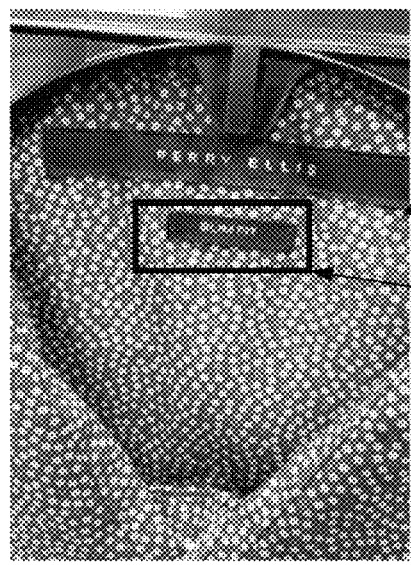
FIGS. 5a to 5c illustrate images of yet a further product and show how the chaotic aspect may be produced as a result of the manufacturing process.
Figure 5B:
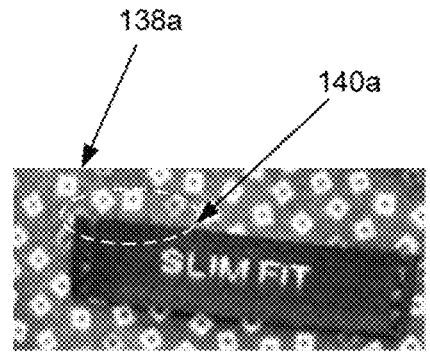
Figure 5C:
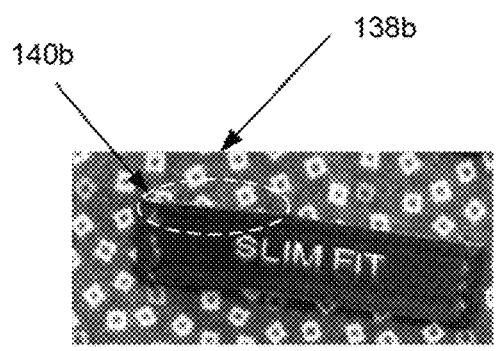

A further example is shown in FIGS. 5a and 5b which shows how the chaotic aspect may be produced as a result of the manufacturing process. FIG. 5a is a top view of a product. FIG. 5b is dose up view of the ROI of the product shown in FIG. 5a and FIG. 5c is dose up view of the ROI in an image associated with a different product from the same series of the product of FIG. 5a.

In particular, FIG. 5a illustrates a picture 136 of a shirt by the brand Perry Ellis®. The picture 136 includes a ROI 138. FIG. 5b is close up view of the ROI 138a of the shirt of FIG. 5a, and FIG. 5b is a close up view of the ROI 138b of another shirt but in the same location. As shown at 140a the area beside the sticker "SLIM FIT" in FIG. 5b includes three squares that are spaced apart from the sticker. By contrast, FIG. 5c shows two squares that are partially provided under the sticker and another square that is just in touch with the sticker. This is an example of another type of chaotic signatures that the server may detect in the pictures and look for in the images received from the user.

Figure 6:
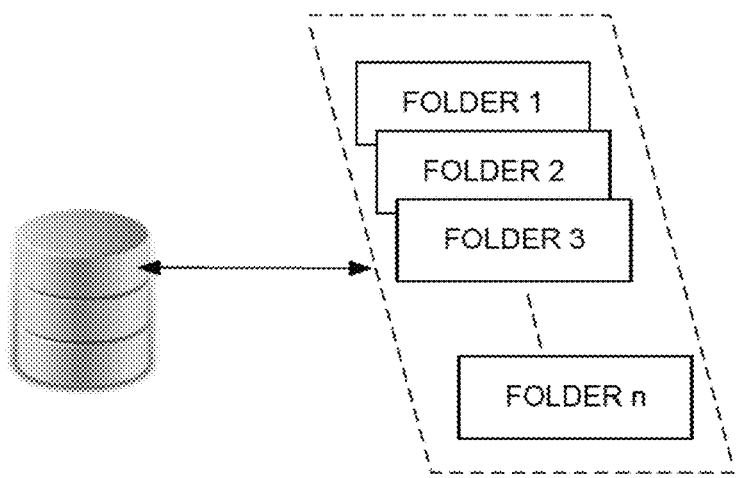
FIG. 6 illustrates an example of a database including a plurality of folders 1-$n$, each folder containing images of genuine products of the same product series.

In an embodiment, the server may, based on the shape, color and other aspects of the product, classify the products belonging to the same series (aka line of products) in a given folder for facilitating the search when receiving images from the user. For example, as shown in FIG. 6, the database may include a plurality of folders 1-n each folder containing images of genuine products of the same product series e.g. PERRY FLUS® slim fit shirts, or the Monogram Delightful® series by Louis Vuitton® etc. Analysis of such a characteristic image can be done using either an imbedded solution using a GIST kind of method or a ORBS or SURF method to extract descriptors feeding a LSH (Locally Sensitive Hashing) tree, but can also be done using online solution like the QUALCOMM Vuforia SURF implementation or MoodStock search engine implementation which offer solutions that are essentially able to give a rough identification of the product for Phase 2.1.

Figure 7:
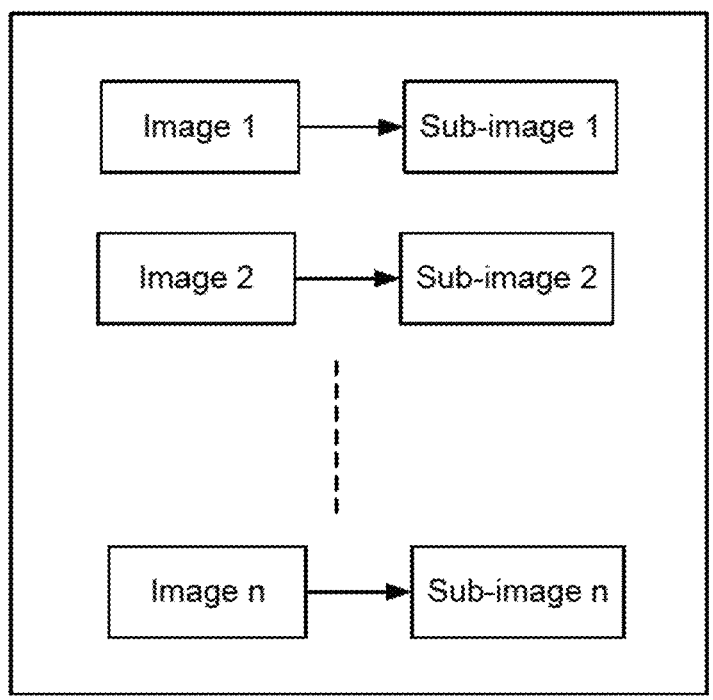
FIG. 7 illustrates an exemplary configuration of a folder associated with a given product series.

In a further embodiment, the server may associate with each image of a genuine product a sub-image representing one of the ROI of that image as exemplified in FIG. 7. FIG. 7 illustrates an exemplary configuration of a folder associated with a given product series. The sub-images may be used for expediting the comparison process whereby the server may compare the pixels in the received image with each sub-image representing each stored chaotic signature of a genuine product until a match occurs or until the entire folder is searched without any match.

Accordingly, when receiving the image from the useriapp, the identification process begins. The server may first determine the product line, and when the product line is determined the server may start searching in the folder associated with that product line in order to find whether or not a previously photographed genuine product exists which has the same chaotic signature as in the received picture. Therefore, if the received image does not have a sufficient quality that allows for searching for the chaotic signature, the server may send a notification back to the portable device asking for another picture. The notification may be accompanied with a certain message to display to the user on the portable device such as for example: not sufficient lighting, or too much lighting, or change position etc.

In an embodiment, and in order to expedite the identification process and make it acceptable to reduce the waiting time for the client (user) who is waiting for a response, the identification process only delivers one to many (<100) plausible candidates to a final processing stage for final comparison with the received image. In other words, if there are 100,000 registered products in the database, hence at least 100,000 images (each image representing one authentic product), the identification process may chose a smaller subset of images e.g. ¹⁄₁₀₀₀ to ¹⁄₁₀₀₀₀ of the entire set of images for comparing them with the received image. The selection of this subset is based on the features set. In particular, the server may chose the images having features set that are the closest to the received image to then compare each one of those images to the received image using an authentication process that is more thorough and subsequently more CPU intensive. In an example, the server may only chose 100 images maximum for this final comparison step. Therefore, the final decision by the server may be rendered in about 10 sec not counting communication delays between the user and the server.

The purpose of this stage is to certify beyond a reasonable doubt that one or none of the identified sets offers sufficient similarity to the received image so that the outcome probability that the object is genuine can be asserted. The reason of such 2 strokes action is due to the long processing time that can require an Authentication process for all the recoded products in the database which depending on the type of product may reach millions. The analysis of chaotic area can be either completely pattern dependent, looking for a pattern at any place using an algorithm like a GIST, SURF or a BOF (Bag Of Features) to generate descriptors working on a pre-processed image. The preprocessing may be done in the portable device but the GIST analysis is preferably done at the server.

Then the server side analyzer enters the authentication process working on the very limited subset but using a fine pattern analysis mode. The identification process uses an algorithm that deliver a plausible CTM (coordinates transformation matrix) allowing to transform the perspective distorted image that also very frequently exhibits rotation or even slant. In one embodiment the authentication process can use algorithm methodologies derived from fingerprint authentication processing taking the smears and curves out of the oriented gradient processing. The fingerprint algorithm delivers reasonable success and mainly very low level of mistakes. The penalty is that it frequently delivers a higher level of undetermined situations (neither a yes nor a no). This may be reported to user who in turn should be guided to take another snapshot. In another embodiment, it is possible to use a specific algorithm made of speculative pattern matching in a wavelet converted image. This gives a certain flexibility to compensate for orientation beyond the CTM delivered by the identification phase.

However, an enhanced embodiment exists whereby the identification process is advantageously helped by making a certain number of position within the image available as anchor points that can be used to determine the position where to search for chaotic salient point. This is exemplified in FIG. 3b at 124, and FIG. 4b at 131 where the anchor point (or beacon) are determined from points that exist and are common in nearly all manufactured goods for each product, line as part of the design and that have no or very few chaotic comportment.

Anchor points are considered as points of interest, for example constellation of peaks out of the gradient image, which have a common geographical location. An example of a criteria that can be used for the tolerance of commonality of geographical location evaluated during the Anchor point determination can be the Chi-square of position dispersion. This dispersion of position is kept as a parameter that will characterize the anchor point. Anchor points sets are used to characterize more easily the object and optionally identify a batch or a manufacturing method. When anchor points are available (determined by processing the batch of images for a class of same product line) then the analysis of chaotic area or interest can occur more easily. The relative position of chaotic salient point of chaotic area (ROI) is then metered to a reasonable number of all surrounding anchor points. The value kept is the distance, the angle versus a relative horizon and the quality of dispersion of the anchor point. This information is stored in the central database. The number of Anchor points within a radius of a chaotic point determines a statistical minimum and maximum allowing to decode the constellation during reading and asserts a quality of recognition based on the number of points found versus all the point that had been stored during the registration.

It is also possible sometimes that Anchor points themselves exhibit sufficient chaotic dispersion so that it should be very unlikely that the positions of anchors point between themselves are sufficient for a unique discrimination of the goods. While being true on some goods. It did appear that this direct method is setting constraints on the algorithms that can be used to search for these signatures made of the differences of distances. While using anchor points and additionally using a pattern that should be at a certain bearing of the anchor points increase the flexibility offered for these fuzzy searches. Too many parameters are uncontrolled while being involved in the whole chain of analysis. For example, the moisture in the atmosphere where the goods are stored and also the way the goods are stored or stacked may distorted it slightly within acceptable tolerance for the end user, while it definitively changes the geometries of the galaxy of the features set. Therefore this 2 levels approach allows the pattern detection of chaotic features to be done using a smaller area for the ROI, which is better for dealing with a distorted final product, and simultaneously the presence of anchor points allows this smaller pattern area in the ROI to still be easy enough to position and then correlate with the content of the central image database.

The difficulties of the art lies in the tradeoff necessary between the low precision position delivered by the capture system with rotation, scaling and even natural perspective distortions, compared to the high precision position needed by a safe authentication system. These distortions are a consequence of the coarse nature of the image pickup device, generally hand held device which is held without great concern by consumer at time of pickup. A minimum guidance is needed and offered, as it can be seen on FIG. 12 and FIG. 13 where the bracket like 1022 does guide the user to have a picture as compatible with a 90 degrees modulus as possible while decreasing shear, slant and maximizing image size. However without additional guidance either by the computer using computer vision CV to establish correction factor, or more efficiently using capabilities offered by the Augmented Reality Paradigm and tools, this precision of pickup is largely insufficient to narrow down the samples to scan to a decent minimum. The interest of combining the AR with Authentication method is to allow this high precision position to be determined with the help of the AR system and generally asking the user to focus on some very specific area at very close range, This allows to find safer anchor points that allow for a simpler scanning of the image to find if a decent amount of the expected patterns from the original image exist in the submitted sample.

The benefit of the AR recognition phase is that it can be repeated at various scales over the same object to gradually qualify the object at closer and closer range still keeping previous probability of being genuine for a progressive aggregation until it reach a sufficient level or all ROI are scanned and it failed to deliver a conform probability or being genuine. To exemplify this, FIG. 12 shows an object (Art) as FIG. 14 at long range recognized by the AR system. The white spot like 1021 represents anchor points as found by the recognition system. They allow to estimate a decently precise CTM (current transformation matrix) and extract from the AR database the Asset that must be associated) with this candidate to be displayed atop the Art, this suggests to the user to close up on areas of interest for Authentication (ROI), like the area 1031 shown in FIG. 17. FIG. 15 shows the same object but with the closer range pickup. It had also been recognized by the AR identifier and anchor points determined as shown by bright white spots. It quickly appears that the signature of the artist is a structure that are of a medium entropy, means are regular enough to allow a good chance that feature points (descriptors) like ORBS can be found and efficiently used (the bright white spots alike 1021), as well as giving enough of these feature points with a rather high precision so that a pattern matching can start with a decent load on CPU because the number of tries needed is thankfully limited by the high precision of positioning which decrease the need to try various shift and scale and even rotation.

This capability to guide user is of high interest as it is shown on FIGS. 14 to 15. The device is started, the AR system performs a first recognition which allows to know that at least this artwork is known by the system, then it suggests a predefined area of interest in the form a certain number of areas where the apparatus would like the user to focus on. It then displays a bullseye and an arrow to guide the user to take a closer picture of the area that is indicated on the screen display. When a recognition is established, this in itself is first good sign of existence of similar products in the database (the initial probability of the feature set is based for example on the number of goods which have similar descriptors the sets for goods that are different). Subsequently, the purpose of the next action is to qualify a certain pattern and/or intersection of patterns such as for example the line of the signature with the texture of the paper, this natural alliance of chaos cannot be reproduced at least using known technics as of today.

Once the user takes a closer picture of area 1021 then the process starts the image transform and pattern analysis. FIG. 16 shows a first level of image transform done through a gradient localized in a direction, this make the structure of the paper appear. The AR system will allow to help user focusing on this area with their own tracking mechanism and the assets here are the arrow and the bullseye (see FIG. 13). Then either in real time over the video feed or trough action of the camera, a picture of higher resolution will be taken on a more critical area ROI, in this particular example the ROI is shown as being area 1041.

Figure 18:
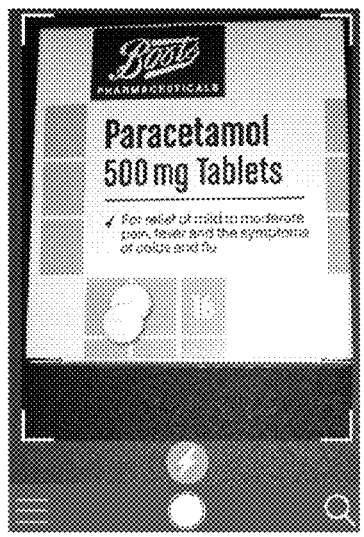
Figure 19:
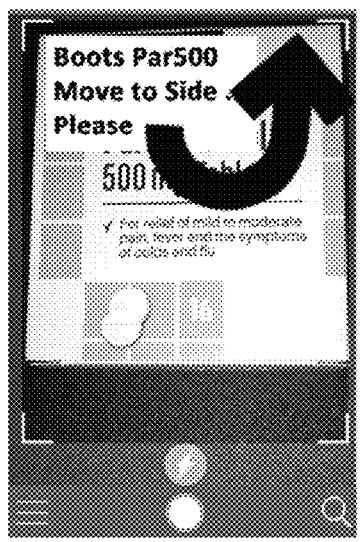
Figure 20:
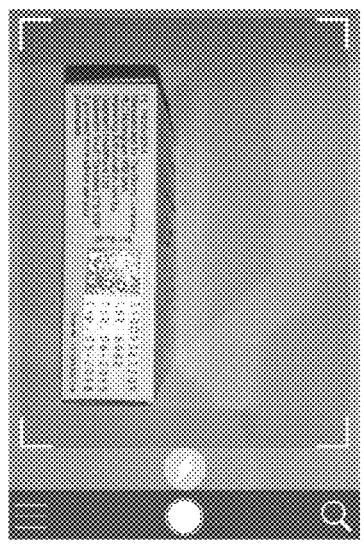
Figure 21:
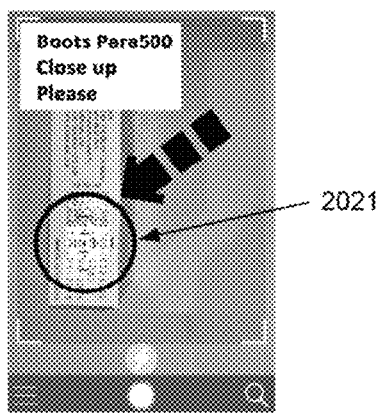
Figure 22:
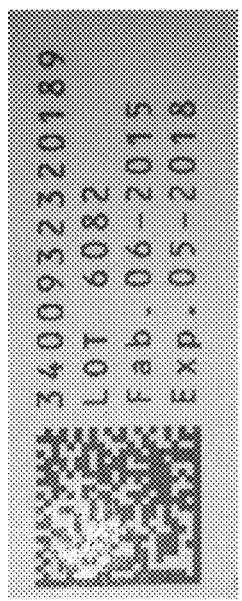
Figure 23:
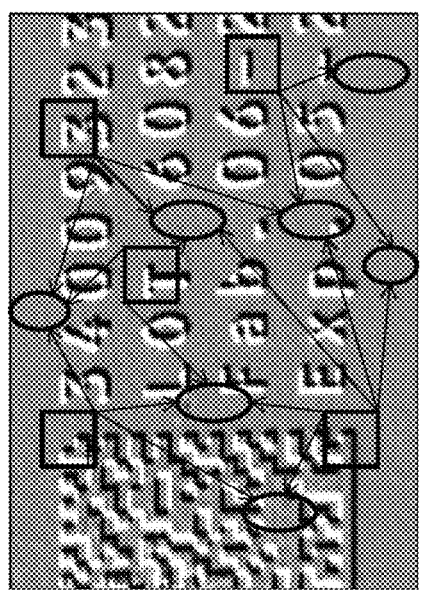

Another example is depicted by FIGS. 18 to 23 where the full process is explained. FIG. 18 shows the view from the smartphone side before being identified, then FIG. 19 shows the response once the package has been identified. As it is known to have better ROI on a side (this will be FIG. 22), the user is driven to take another view of the package as in FIG. 26. Once identified the AR embarks again and suggests to have a close view of a ROI in FIG. 21. This allows a high resolution image to be taken as shown in FIG. 22. FIG. 23 depicts the image once processed and shows the anchor points (rectangles) and the area of pattern search (ellipse). The anchor points had been determined as a constant pattern from image to image during take-up and as maximizing the usage of Vertical and horizontal shape that are less likely to be chaotic, therefore, they can be expected to be present in almost every image of the same product line. This is also exemplified on FIG. 11b where the printed barcode itself naturally offers anchor points. As well as on FIG. 4c with label and stitches.

Hence the interest there is to focus on barcode, not for the code itself but also for the alignment it provides which can be used as a reference for metering the pattern. In FIG. 22 it can also be seen that the manufacturer had to affix production information that allows a drastic reduction in the number of pattern to check against. It can be seen that patterns are expected at some specific place so that it is not of interest to scan every place for every pattern but rather use a pattern matching and displacement analysis.

For example, in the pharmaceutical industry, lot numbers are usually in the ranges of 1000 to 100,000 while the product manufactured can include millions of units. In other words, 1000-100,000 units can have the same lot number on them. Therefore, it is possible to narrow down the search from millions to 100,000 sets of patterns which can be reasonably explored even with a crude enumerating process (pattern size is typically 16×16 and a CPU can compare 1 Millions/second so that 10 second over 100 000 set allow to have 10 patterns/set check at 10 position, which appears to be more than sufficient as generally there is always at least 6 patterns that differs between products made with a substrate like leather, paper, wood, clothe, embossed plastics, and in general all high chaotic substrate. It can be noted that a tree organization of patterns allow to drastically speed up even such enumeration process.

Another scenario is to look for the serial number (if any) and search for the chaotic signature in the ROI for this product. However, not all products have serial numbers, which necessitates the methods discussed above for narrowing down the search. Other cases of unique products include art work such as original paintings which are by default unique.

Figure 24:
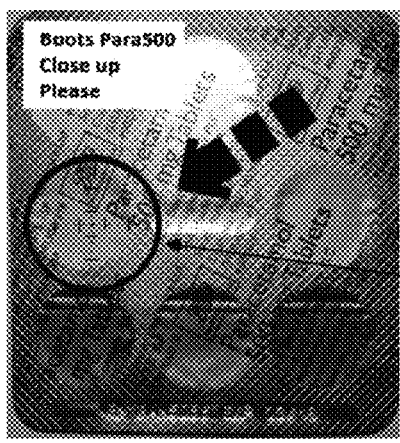
Figure 25:
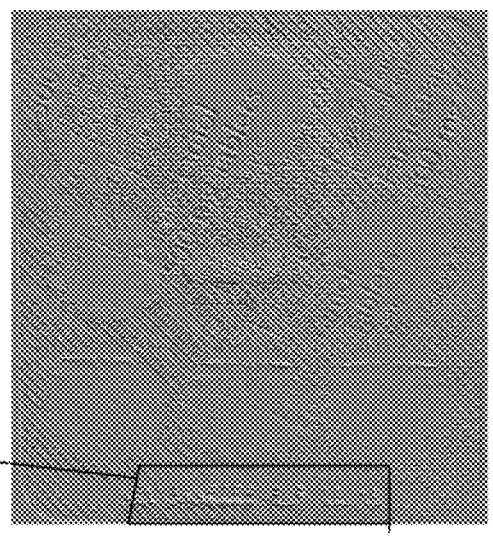
Figure 26:
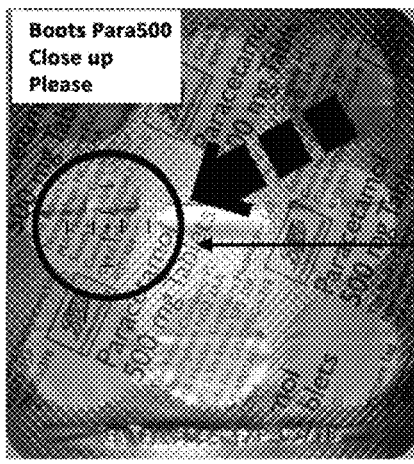
Figure 27:
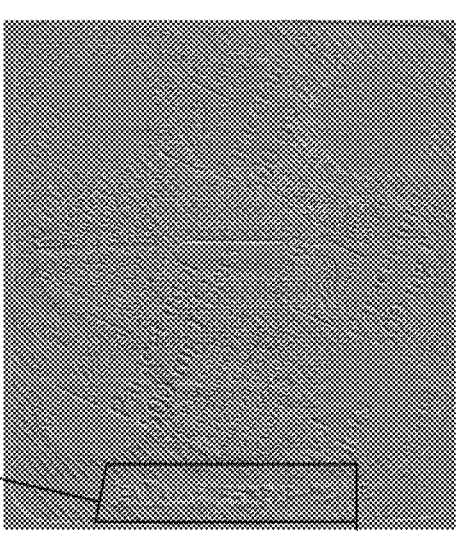
Figure 28:
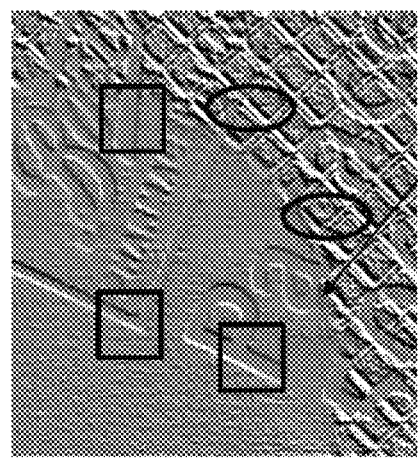
Figure 29:
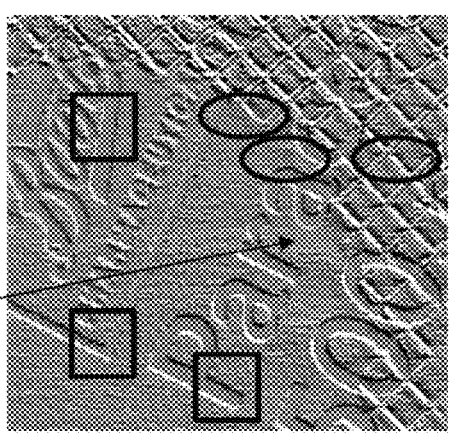

Another exemplification is depicted in FIGS. 24 to 29 which deal with the blister of the drug. FIGS. 24 and 26 represent two different blisters and the Identification successfully embarks on both pictures asking for a close up of a ROI (3010) and (3020). The full size gradient shown on FIGS. 19 and 27 are for the sake of general understanding but the apparatus may focus on ROIs only. The information on the side of the blister (3011) and (3021) are of interest to be decoded with a glyph recognition (Support Vector Machine (SVM) which is a typical first stage of an OCR) to determine if some alpha-numerical information would allow a reduction in the number of pattern to cross analyze. The ROI of FIG. 28 and FIG. 29 show anchor points (rectangles) and pattern area (ellipse). It must be noted that 3050 and 3060 are emphasizing the difference that exists between the two blisters. An extreme difference exists here but it is an exemplification of the natural manufacturing chaos occurring during the processing that, which chaos is rare in nature and creates the authentication area that uniquely identifies the product or gives a strong indication that the product is authentic.

Such numerical analysis to matching can be expected in a simple and 1/1 relationship on some products that have a serial number. Analyzing the chaotic pattern naturally or purposely added onto the bank note allows for an absolute identification of genuine banknote in a 1/1 mode.

The concept of anchor point allows to reduce the computational problem to avoid analysis using a topography method such as the triangulation method, close to astronomical position analysis, in which the apparatus first uses a detector to identify a first object and its weighted center, then establishes the evolution of the first object based on the metrics determined by the position acquired by triangulation of two other objects known to exist and which form a triangle qualified by angles with the first object. However, many differences between the embodiments and the angular based triangulation method. For example, if the other two objects are not detected the triangulation method determines that the first object also does not exist or does not qualify.

However, in the present embodiments very many relevant objects may exist and very many fake irrelevant/fake objects may also exist at the relevant place (ROI). Therefore, there exists a necessity to assemble a multitude of signature sets and compare them to a reference database. Accordingly, a statistical analysis is used to measure the distance between the anchor points and the ROIs which may then create a plurality of probabilities associated with the different sets of ROIs, each set being associated with a different product. The plurality of probabilities may then be combine into a final probability.

For example, a product may have 100 different patterns at some specific ROI, and another product may have another set of patterns at a different ROI. During authentication phase, the first result of pattern matching may deliver patterns coming from the first set and may very well determine patterns coming from the second set. Therefore, the misplacement of pattern should be resolved using the statistical analysis to authenticate the most relevant set of pattern as being the one having the highest number of patterns in the given ROI and the best match between pattern and candidate image in each ROI found to be at the proper distance between anchor points and pattern.

Other attempts have been made to perform authentication using pattern matching. One of these methods uses analysis of a cross section of pattern (as if the pattern is like a fuzzy barcode) using a classification based on weak coincidence of code which is strengthened with the number of decently close match of code. Other methods use classification methods based on the number of patterns that have a decent image match while being simultaneously in immediate vicinity of a relative other pattern matching in same condition. However, the present embodiments do not consider the amount of relationship between patterns in immediate vicinity, but rather use classification through analysis of distance to at least one reference point i.e. the anchor points.

Other methods exists which are color/intensity based approaches which look at a substrate to identify colors and their intensities in different areas on a document. These method do not use the pattern identification approach per se, but rather a merged pattern intensity in which the loci of analysis must be precise to avoid influence of nearby printing. The side effect here is to decrease the requirement of precision of location. Typically these methods are mainly used with very regular products like banknotes, but do not properly work on productions that have wide varieties of aspects like paint or variations during production, like drugs blisters. Some additional approaches exist which are labelled as being pattern based but which in fact look at patterns as shapes that must exist, and not as pixels sets. These shapes are looked for during authentication without performing a reconstruction which requires a high quality image pickup. The main problem with these approaches is that they decrease the probability to successfully authenticate if the image intake is of bad quality or not-normed. Yet an additional approach exists which is based on pattern analysis and which requires high magnification which inherently allow seizing more of chaotic nature of substrate which greatly simplify the issue because the variety of pattern is high enough to look for a one/one relation (a pattern have very small to none chance to belong to another product). The identification of the pattern area become crucial and apply mainly in cases where the product itself can be checked using a method that allows a physical analysis of the position. This approach optimizes the case of false positive because the severity of the process is too high. In other words, the number of cases where a product is identified as being genuine when in fact it is not are extremely diminished, but the penalty is the increase in the number of cases where genuine products are not identified as such, which in fact is very bad from the standpoint of the manufacturer who is generally paying for the service.

In a non-limiting example of implementation, the principle may accumulate the distance to anchor points, subtracted from expected distance, thus establishing a score based on the sum of delta of distances. When a distance is beyond reasonable values, it is completely discarded. The Sum Of Square differences (SSD) or alike norma of matching of difference between pattern and target, are compounded in this analysis. As an example for values used in a main embodiment. If the SSD is 30% of maximum match for the analysis session then the tolerance on distance before being discarded is 20% if the pattern matching SSD is higher than 66% then the tolerance on distance is lower in the range of 5%. The counter-intuitive principle being that a strong matching with a crude method like SSD is rather an oddity and should not be bonified. While the embodiments use the SSD method, it must be noted that the embodiments are not limited to this method and that other pattern matching methods are available for example in CV library like OpenCV and can be used with such approach. The maximum for the analysis session being determined with the analysis of the dispersion of SSD, the regularity of high score being a strong indicator of the quality of the match set analysis. While a dispersion that may even include some very strong matching is a negative indication of a matching authentication. This information may be compounded using a Neural Network with a training set done using various substrates. It must be noted that preliminary to or during the capturing of images of the reference images, there generally exists the possibility to inform the system about the nature of the substrate in the object, which allows a user to match it to a predefined category (Wood, Leather, Cardboard, paper, plastics, skin, woven fabrics, agglomerated grains, etc . . . ) so that the Trained Set used at classification for final aggregation of all scores, can be chosen based on this specificity allowing greater discrimination which allows to increase tolerance to change of shape of the object versus the reference image. This is typically a more critical problem when analyzing object made of leather or cloth, while being a less critical problem because this kind of objects substrates naturally exhibits more randomness of the natural chaos. Accordingly, a decrease of constraints for qualification keeps the operational quality of the authentication above the needed requirement.

Pattern searching and identification of pattern from a database is difficult to put in a generalized tree like method that would allow a scan through very many pattern sets. This is due to the amount of combination of patterns that create a set and the similarity between the patterns of different sets. In some case the recognition of the object allow to focus on only one reference image like in example on FIG. 14 for an artwork which is unique, or as exemplified here of a lithography in limited quantity, and numbered (as exemplified by area 1011 which explicit the sample printed) these cases are near perfect cases as the set of pattern to check against is de-facto limited in size. But in some other case like the drugs box on FIG. 18 or on the blister on FIG. 24, the number of reference images can be huge (size of a batch lot), so that even if the apparatus narrows down the number of references to scan through various mechanism, like the batch number (2010) or (3010) on the blister, there is still a need to scan many reference images.

While the LSH tree allows for some organization of pattern for fuzzy search, another approach using a reverse principle where for each pattern the associated data are the list of products that may contain it, is more efficient in the main embodiment. When the amount of reference image is very high the sortation approach described above for finding the best pattern (10 pattern/set tried for match at 10 positions) can be of a cardinality sized to have a geometrical progression with samples and requires minutes of CPU for processing time. Then the pattern search can benefit to create and "a posterior" principle because using square of 16×16 this deliver enough case where nearly each combination of 16×16 square may be used, either within the same reference image at various locations, or across all the reference images. It is then of interest to use a memory based indexing mechanism as this 16*16 square can be coded as 16+16 bits which would lead to 32 bits to index every combination of patterns. This allows to create for each of those $2^{32} \approx 4$ Billion patterns a list of reference image index and their ROI locations which allows to speed up the search by quickly decimating patterns that are not existing and then filter the commonality of position and index of the reference. The position to an anchor point is a key component of the final determination. The embodiments can properly operate using 1K square patterns to analyses (64×16) patterns, each pattern being 16*16 pixels over an image of 2K*1K pixels once areas of no interest are eliminated. The distance of pattern to anchor point is in itself a sufficient factor for classification because the aggregation of found distances subtracted from the expected distance deliver a final score that involves 1000 distances which if coded over 4 bits deliver a 4K bits precision for the index. The implementation of the main embodiment does not allow a high precision because it had been evaluated from the rules in industry that 128 bits are sufficient to qualify the uniqueness of an object. Accordingly, the embodiments only consider patterns that appear in the ROI at a distance of maximum 4 pixels from the anchor point.

However, for the case where we have millions of products to search against, even optimized pattern matching such as the methods discussed above, can be expensive in term of CPU bandwidth/usage to allow for a decent response time. And knowing a-priori precisely (pixel precision) where to search for a match of pattern of a set will dramatically speed up the pattern matching. The main embodiment uses a specific method accelerator in this case to reduce the response time.

The principle of this accelerator relies on a subpart of the H264 compression encoding, by deriving the pattern matching from the motion estimator used in the H264 compression algorithm (http://web.stanford.edu/class/ee398a/handouts/lectures/EE398a_MotionEstimation2012.pdf). This allows to use hardware assisted systems and feeding a deeply modified version of the encoder, keeping only the analyzer, and where the supplied image from the Device is the "moving" image and where the reference image act as a "previous" frame. This allows to aggregate the vector and direction of vector to determine the accuracy of the matching.

This method dramatically speeds up the search and is also improved by reducing the amount of tile to check focusing on a subset determined at registration time. This set is based on a histogram of frequencies and the tile which exhibit the best homogenous histogram (modeled after a search for a "flat line") is the most interesting.

A 4K×4K encoder working on a subset made of 1K square of 16×16, allow to compute (4000/1000)*(4000/16)*30 Comparison/seconds which is in the range of 30000 vector of displacement of pattern/sec, the organization of search can also be improved with tree organized search prequalifying certain aspects of pattern using a method as explained above, this gives a factor 100 to the efficiency toward a brute force scan, so that a machine can compare an average of 10 Million references images in a bit over 3 seconds. As it is more interesting to try slight changes in position of the sample image (4 different shift and 2 scale) this decreases the throughput to an average of change 1.1 Millions/sec which is a good high mark limits of the number of reference to scan once the AR experience allows to decrease the field of product to explore (a drug batch size of a common drugs are in the 100,000 sample range for blisters.)

If the pattern matching method fails to deliver a sufficiently high score at proper positions of anchors point, or in general if a confirmation is requested using another approach the later decision can become a need due to lighting conditions, then another confirmation method embarks using as much as possible of the information from the previous one in particular about positioning of the sample image.

This method uses the fact that most chaotic aspect out of the image transformation using frequency gives way to a lattice like pattern. Otherwise described as a labyrinths. The search will take some lattice node and dive in the lattice of the reference image at some specific entry point. This in turn allow to aggregate a score made of the total of length of path that do match between the 2 lattices.

The interest of this method is to simplify the search of the best insertion point, If the insertion point for the search is badly chosen then rapidly the amount of length covered by the similarity of path become small however at each intersecting within a limited distance, the search may restart using already computed path but considering them as part of the same reference node but inserted at different place in the sample image. This allow to rapidly allow a re-adjustment of the analysis.

At each major crossing points the computation can be done starting another thread that will re-evaluate the pertinence of this point as a better entry point.

The insertion point can be such as putting grid of squares 16×16 then within each squares sort places if the lattice where path intersects the more path lead to a place the more interesting this intersection is and should be consider as an entry point for the search.

The radius of search is typically equal to 1 square i.e. covers 32×32 pixels.

The computation is organized by first doing the image processing needed to extract edges of gradient, then converted to a skeleton of single pixels applying a kernel convolution to erode the paths. When the skeleton convolution is done, a process maybe started to join "interrupted" lattice paths, based on a tangential approach, (at last 3 pixels aligned allow to bridge another lattice sub path if same 3 pixels tangent exist on the other side and the bridge doesn't need to cover more than a couple of pixels. This compensates for disappearance of continuity in the sample image mainly due to poor lighting condition. Incidentally this allows a certain analysis of the quality of the image as the number of bridges needed gives an indication of the difference of quality with the image pickup done on the reference image.

Then path too close (1 pixels apart) are joined and eroded again.

This complex processing is justified by the interest there is to feed a massively multithreaded architecture like the one available for CPU assistance by GPU like the NVidia GPU architecture in CUDA. So that these massive amounts of processors can all work in parallel doing the path analysis as well as reconsider node numbering as described above.

The image processing part can also be done in the GPU. This approach allows for a strong confirmation of authenticity while preserving a flexibility on the aspect of the image which is compatible with the poor pickup image.

The performance is improved by an organization of node between reference images which allow to create a tree of similar locality of node across reference images using a very similar approach as the one described above for similarity of square 16×16 when many reference exists.

Figures 1, 30:
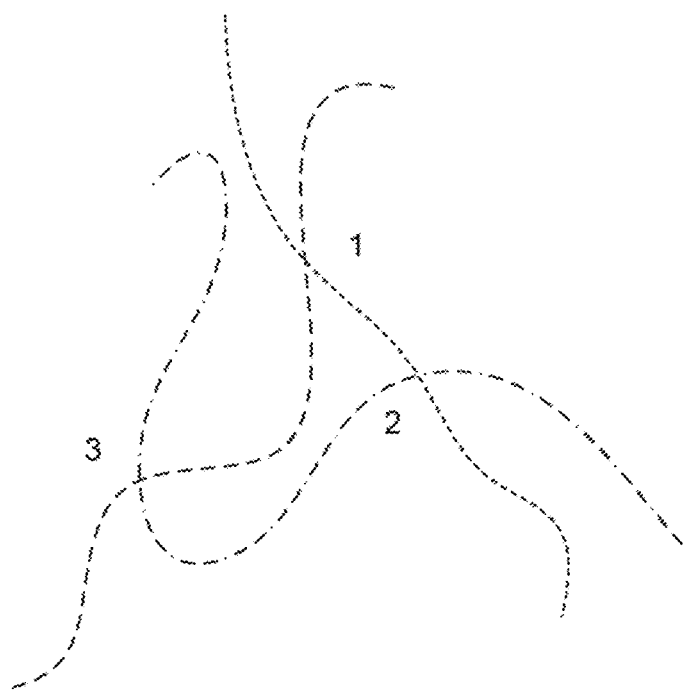
Figures 2, 30:
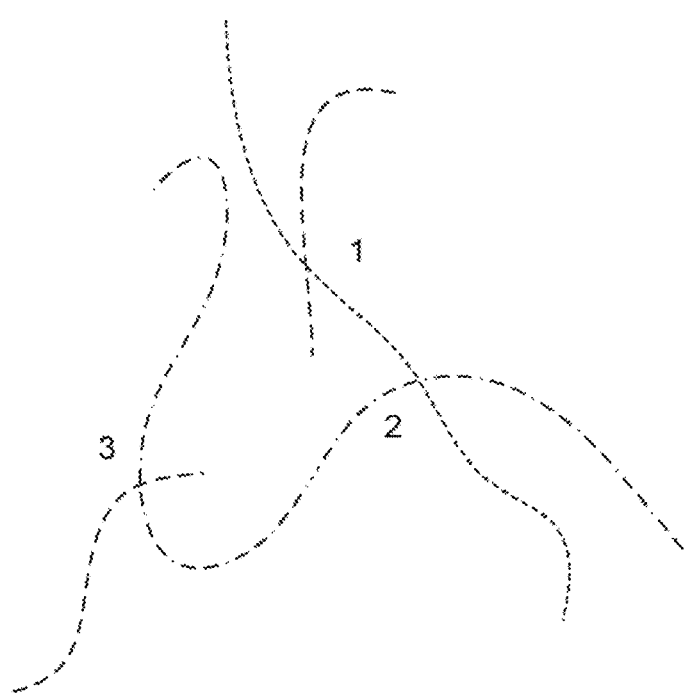
Figures 3, 30:
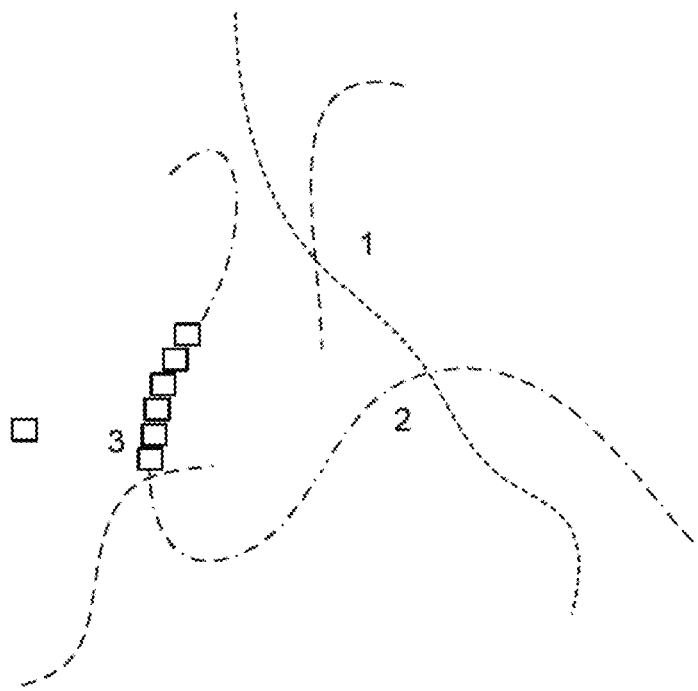
Figures 4, 30:
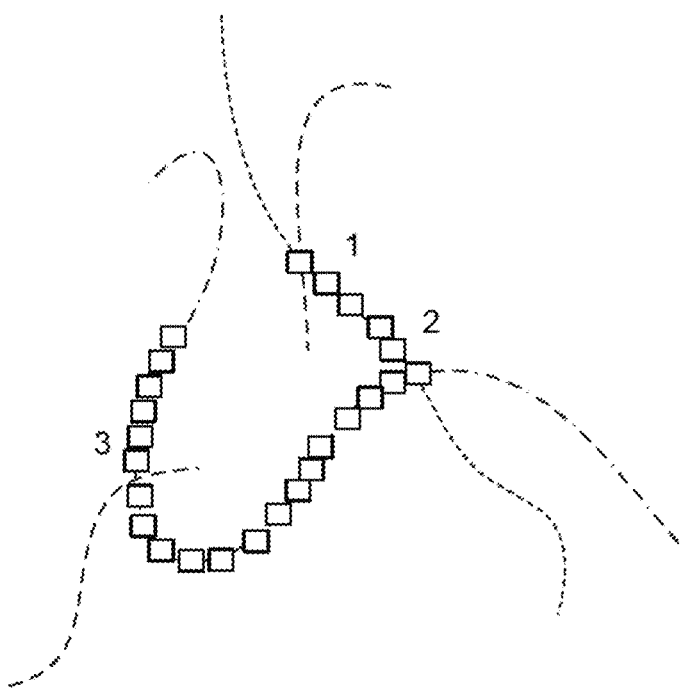

An example is described in FIGS. 30-1 to 30-4. FIGS. 30-1 to 30-4 illustrate an example of a method for determining the authenticity of a product by progressively detecting a lattice defining a web comprising a plurality of paths in an image. The lattice may be taken out of a reference image and FIG. 30-2 represents a lattice taken out of a candidate image. As clearly shown in FIG. 4-2 a discontinuity exists in the line joining the nodes 1 and 3, when compared to FIG. 30-1. Also as shown in FIGS. 30-1 and 30-2, three nodes exists which are numbered 1-3 between the three different lines that define the lattice. The embodiments may chose the nodes as an entry point in order to circulate the lattice to determine the authenticity of FIG. 30-2 with respect to FIG. 30-1. Assuming that the system chooses node 3 as entry point and mistakenly considers node 3 as being node 2 due to some similarity of the pixels around the two nodes. In the present case, the system may proceed with the processing of the lattice by choosing a path that starts with node 3 expecting to end up at node 1 as exemplified in FIG. 30-3. However, after an expected distance has been travelled on the line, the system may detect that it does not find node 1. In which case, the system may try a different direction as exemplified in FIG. 30-4 until it finds node 2 and re-apply the same strategy to find node 1, which when accomplished can make the system re-asset its initial travel path with a great benefit of being able to use all the computations that are already pre-done by requalifying the end points and re-using the expensive computations of the path.

Processing at the App

As discussed above, since the location of the chaotic signature is not always the same for all the genuine products, the server may have to search different areas within the received image to detect the presence of a previously recorded/photographed chaotic signature.

In one embodiment, the server may apply a progressive targeting to find the area of interest in the received image. This also allows pinpointing known specific location of interest where the frequency dispersion is optimal (e.g. using the same criteria used to detect the chaotic signature in the images of the authentic products). Using such guidance allows going from coarse analysis that delivers probability amounts to target a final very precise area that exhibit a unique identity. This process can be done either within the transmitted images by looking at subsets of the image establishing a pattern matching of a rather generic area until a subset exhibits sufficient similarity in the sense of a Norma like sum of square of difference, applied either on the image or a transformation thereof, or can be done by requiring the device 152 to adjust the pickup to a specific area.

Typically the suggested area used to assist the pattern analyzer use the value of the Mask of ROI computed as explained above. The aspect of such Mask exhibits an irregular shape with peaks and valleys with a noise background. Peaks are directly used as suggestion for the ROI to consider. This human guided method is applied very similarly within the server to consider a succession of ROI. However, because it is executed in the server by an automat going from an ROI to another ROI this occurs in a period of milliseconds for aggregating results of ROI analysis, while using manual operation asking the user to manually take a better snapshot of the ROI, but this time it will occur at the rate in which the user will supply the image. However the speed in this case is not the issue as the user understands naturally that the process requires more areas for certification and at—the contrary the server is not expected to consider multiple ROIs within its own analysis. Selection of a User guided focus on ROI or on a server automatic guided approach on ROI is based on the quality of picture taken for analysis. Below a certain level of quality the system must compensate by asking user for a closer look but on various areas of the object. This also could be needed to compensate for poor quality picture due to poor lighting conditions In another embodiment, the server may also generate statistics related to the ROIs in a given folder of pictures of genuine products. Such statistics may relate to the dimensions and locations of the ROIs for a given product series.

Therefore, and as explained above, if the server could not detect a potential ROI in the image received from the user, the server may send information to the app installed on the phone to guide the user to take a closer picture of a potential location where the ROI may exist. Examples of the type of information that the server may send to the app include: size/dimensions of the ROI relative to the image of the product, the location of the ROI within the image, shape of the ROI, boundaries of the ROI etc.

In addition to the functions discussed above such as taking the picture and sending it to the server etc., the app may be adapted to determine whether or not the image meets the basic requirements of clarity and resolution e.g. avoid obvious cases where picture is blurry or dark etc.

In addition, the app may be equipped with the intelligence that allows it to use the information received from the server to identify/detect the identified location (potential ROI location) on the product being photographed. In a non-limiting example of implementation, the information sent by the server to identify the potential location of the ROI may include one or more of: dimensions of the ROI, surface ratio between the ROI and the surface of the product on which the ROI is located, and location information identifying the location of the ROI within the product. The app may be configured to perform basic image processing to isolate the product from its background to locate the identified ROI using the received information to then guide the user to take closer pictures thereof.

In an embodiment, in addition to the visual indicator 154 the app may be adapted to produce one or more audible sounds, including voice, that help guiding the user in the right orientation and/or direction until a decent picture of the ROI is available at the screen.

Figure 8A:
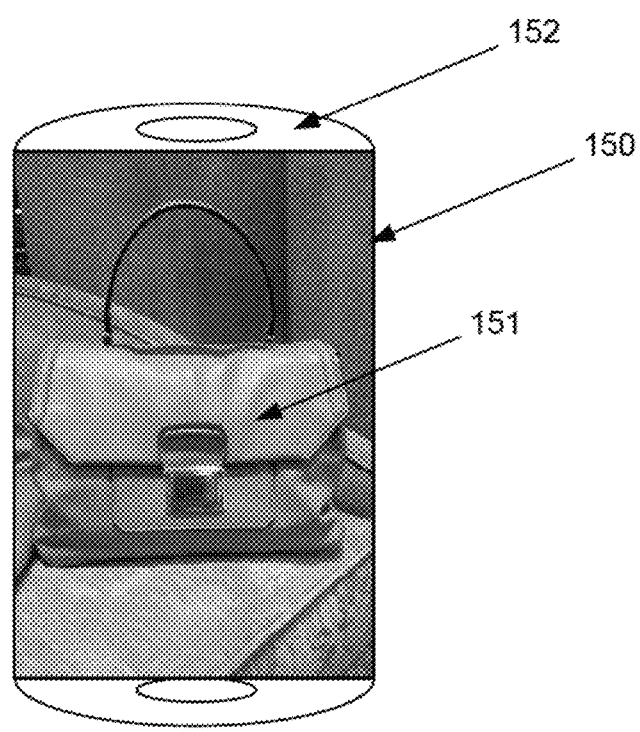
FIGS. 8a-8e illustrate a non-limiting example of implementation of the guiding process.

In an embodiment, the app may be configured to display one or more visual indicators on the screen to guide the user take a closer picture of the identification location that may include a potential ROI. A non-limiting example of implementation of the guiding process is provided in FIGS. 8a-8e. As shown in FIG. 8a, the user takes a picture 150 of a product 151 using a smartphone 152. The picture 150 may then be sent to the server for processing. If the server does not find any match to a pre-recorded chaotic signature, the server may select based on the statistics associated with that line of products another location for the ROI and send the info to the app. The app may use the information to detect the location of the ROI on the photographed product.

Figure 8B:
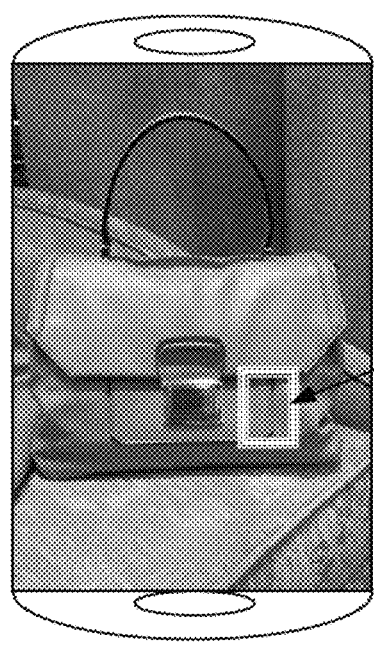
Figure 8C:
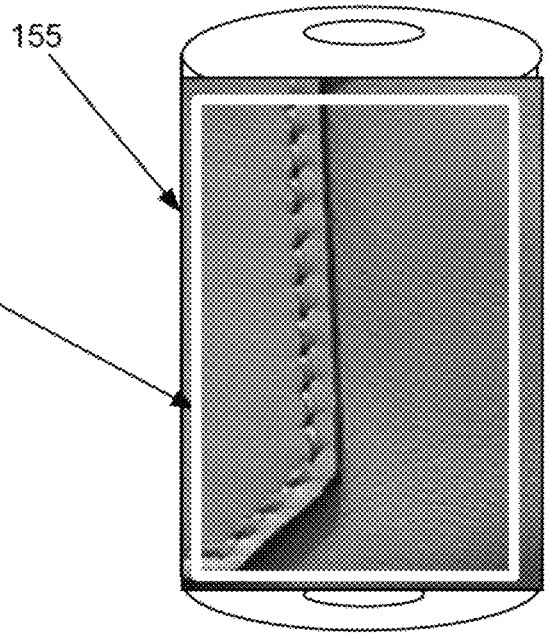
Figure 8D:
Figure 8E:
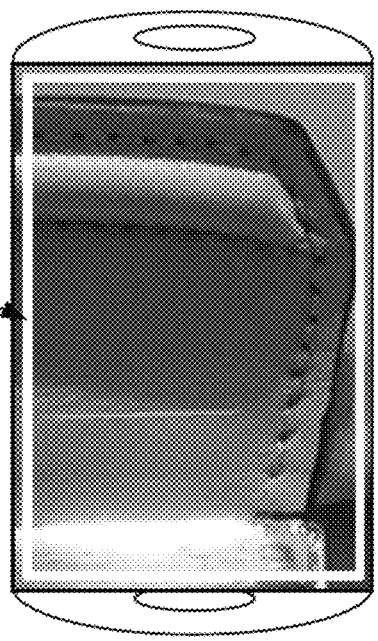

For example, as shown in FIG. 8b, the app may highlight an area 154 on that need to be photographed closer. The user may then bring the device 152 closer to take a closer picture of the identified area as exemplified in FIG. 8c. When the app detects a resolution level which is equal to or above a given threshold the app may then allow the user to take a second picture (e.g. by activating the picture taking button) and send it to the server. As shown in FIG. 8c the surface area of the visual indicator may enlarge as the device 152 approaches the ROI. The device 152 may send the close up picture 155 to the server. If no match exists, the server may request another picture in a different location 156 as exemplified in FIGS. 8d and 8e. The process may continue until a final determination is made.

The final determination may be one of several cases including:
- Genuine: this is the case where an image was found in the database that matches the received image.
- Unknown: Not genuine but not certain as being faked. Meaning no images in the database match the received image;
- Undetectable: the received image does not meet the minimal criteria for image content, typically the expected frequency distribution. In other words, the received image cannot be used to make proper determination;
- Not Genuine: there is a certain number of cases where the good can be either replicated for same serial number including enough of the chaotic aspect, or the good is known from other sources as being a non-registered one. It can come from external sources and can be (without limitation) detected at 2 different places simultaneously, or being sold for a first time at a place that is not an authorized dealer, or being explicitly registered as faked if destruction of good is not the appropriate method, or registered but not yet offered.

If the image is qualified as "Unknown" another embodiment can submit the picture as it was taken over the web to a processing center where human specialist may act as referee and do a human interpretation of the uncertainties either in an absolute manner or using help for comparison with the set of images suspected to be the goods analyzed but that cannot be confirmed.

The server may then send the final determination back to the portable device for display in the app.

In another embodiment, a local version limited to a certain number of digest of the signed image, like a GIST data set and pattern set, may be embedded for some specialized check within the app used for the authentication as discussed below. In the latter case, the portable device may be configured to perform the entire analysis locally without sending the image to the remote server for processing. In a non-limiting example of implementation, the app may have access to the features set of a subset of the registered products. The subset may be specific to a certain manufacturer or line of products. The subset may also be dependent on geographical constraints in the sense that users in a given country will not need access to registered products that are shipped or scheduled to be sold or distributed in a different country or different continent etc.

The latter embodiment is of particular interest when the objects to authenticate are in limited range. This include auctions where offered goods have pretention as for the origin, inventories of luxury goods in warehouse or at borders, the transiting product between two places, e.g. servicing of plane engine parts etc. In these cases the amount of products that are genuine candidates are limited (100 to 10000) then the handheld device may be downloaded in advance with all the features set and authentication pattern necessary for authentication so that a totally offline experience can be conducted using handheld CPU for the whole processing. Methods applied for authenticating many not allow to use gigantic amount of memory nor powerful GPU but on the other side the amount of pattern to check against is very limited (1 Million squares 16×16 average) so that a good result can be achieved within a reasonable amount of time. Eventually removing reference that are check to speed up later usage as the check session occurs.

In an embodiment, the features set may be provided in a library that the app can access for verification purposes. The features set in the library may be updated periodically as new products are registered and/or have reason to be made part of the library. For example, if the product was manufactured and registered but not yet released.

In an embodiment, the app may be specific to a certain manufacturer or line of products, or even a certain badge of products. In other cases, the app may be used for determining authenticity of different and unrelated products e.g. luxury bags, and vaccination syringes.

QR Code and Chaotic Seal

In an embodiment, it is possible to use a QR data matrix in addition to the chaotic seal. For example, a QR data matrix may be provided which defines an empty space/aperture to place over the chaotic seal such that the chaotic seal would be surrounded by the QR data matrix. The chaotic seal may be provided in the form of a piece of wood or another object having a unique shape/signature. The QR data matrix may be provided on a label to be placed over the chaotic signature. An example is provided in FIG. 9.

Figure 9A:
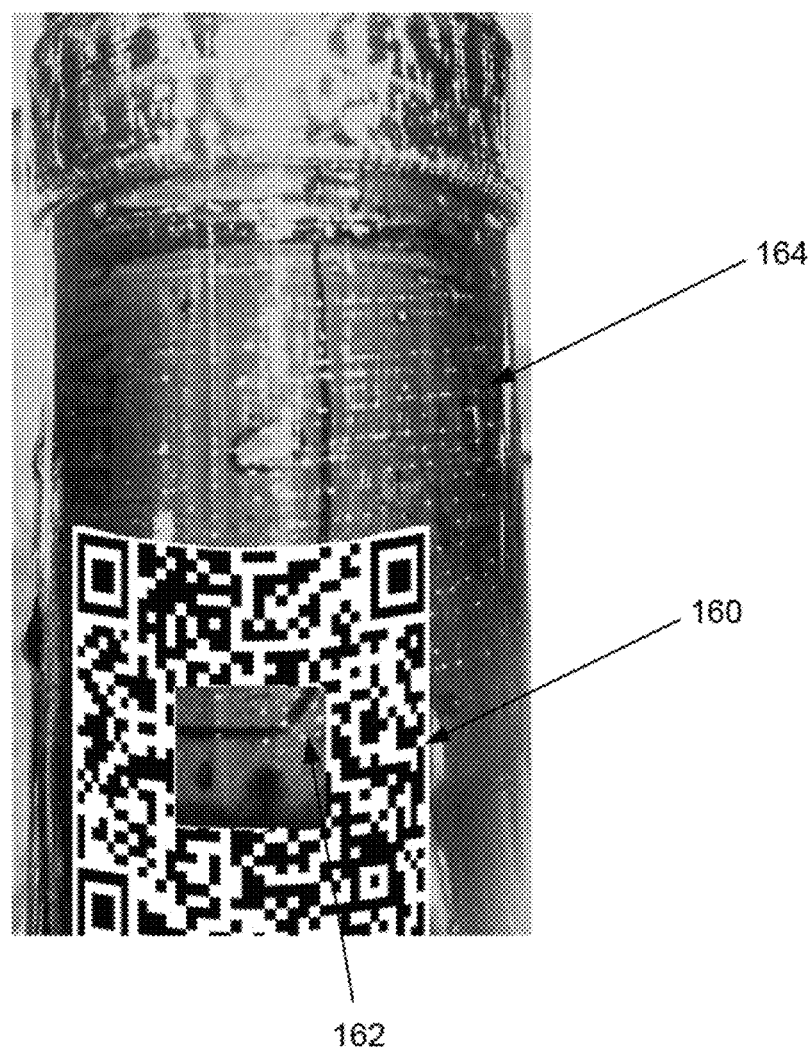
FIG. 9a illustrates an example of a QR data matrix surrounding a chaotic signature on a cork of a bottle.

FIG. 9a illustrates an example of a QR data matrix surrounding a chaotic signature on a cork of a bottle. As shown in FIG. 9a, A QR data matrix 160 defining an aperture 162 is provided on a bottle 164. The aperture 162 allows a visual access to a chaotic signature defined by the shape and lines of cork provided in the bottle. Such embodiment not only allows for identifying the authenticity of the bottle 164 but also to detect whether the bottle was previously opened or not because any dislocation of the features defining the chaotic signature would result in a negative match. The same principle apply to other goods like those delivered in pre-filled syringe.

The QR data embodiment facilitates the search process at the server because the size in pixels and the location of the ROI would be known. Furthermore, the QR data allows for associating meta-information with the product. For example, the label if can very conveniently include or display a serial number. This number will go through an OCR and considerably eases the recognition process by asking for an image based authentication, rather than image based identification.

The QR code can also contains additional focus information aimed at easing the camera pickup, in particular the focal plane of the object 164 can be at a very different depth than the QR code. Typically the camera will first auto focus on the easiest part of the picture, generally the high contrast. Then the QR code can be read and determined the necessary de-focus that would allow the camera to enforce the maximum quality of a small part of the field of view, the aperture 162. So that the quality of the signing chaotic camera pickup is maximized.

The presence of a QR data also eases considerably the analysis of horizontality of the picture at the verification phase, so that pattern authentication can use algorithm of a more speculative nature.

Figure 9B:
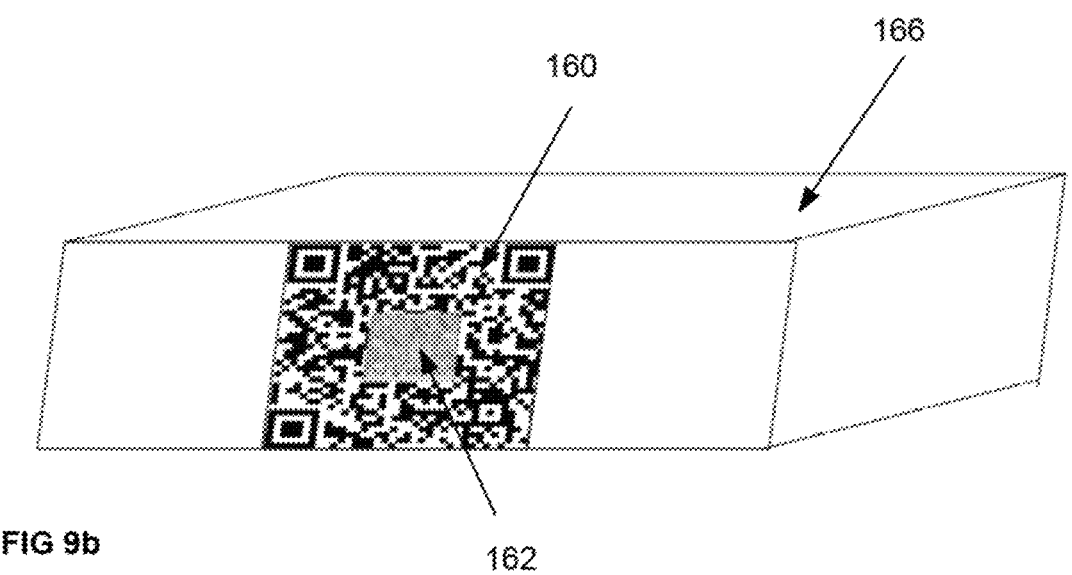
FIG. 9b illustrates an example of a package including a QR data matrix in accordance with an embodiment.

Often, the product is provided in a package, and thus, it would be difficult to open the package to test the authenticity of the product before purchasing it. In an embodiment, the QR data matrix 160 may be provided on the package and a visual access may be provided through the aperture 162 to an area of the product defining the chaotic signature as exemplified in FIG. 9b. FIG. 9b illustrates an example of a package including a QR data matrix in accordance with an embodiment. As shown in FIG. 9b, the QR data matrix 162 provides visual access to the product included in the package 166, thus, providing access to the chaotic signature of the product without having to open the package before purchasing it.

Figure 11A:
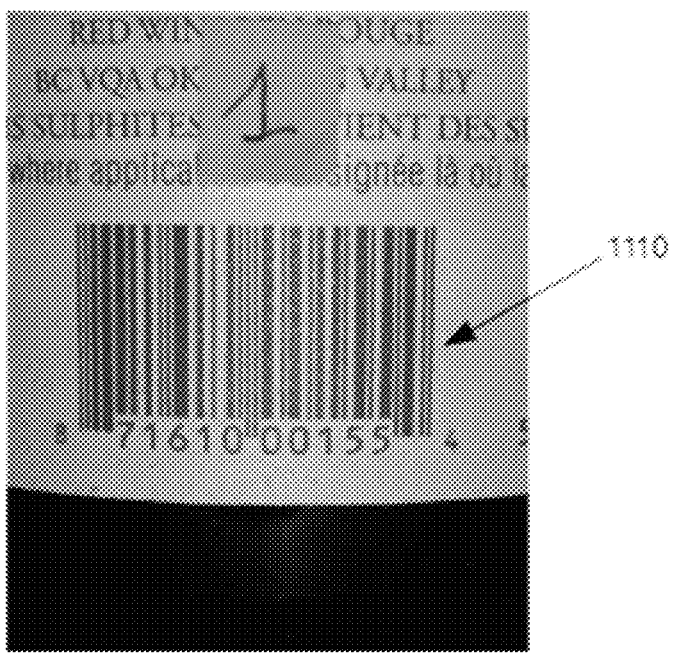
FIG. 11a illustrates a chaotic aspect of paper of a label within vicinity and under a bar code provided on a bottle.

As exemplified in FIG. 11a the structure of the signing pattern can be found in an area of choice like a barcode. In this case the structure of the paper contains sufficient differences from label to label so that it can be used as a signing factor. The richness of such structure can be understood from FIG. 11b which is an image process that neutralizes luminance and enhances high frequencies trough a gradient process over a small amount of pixels. The Anchor point can be taken out of the edge of the Barcode, through a Hough transform looking at crossing of lines, while the chaotic features are taken out of high frequencies that also show a dispersion of characteristics (in other word taking a frequency range just below the highest ray found in the frequency histogram).

The usage of barcode as a help to guide correction of horizon is exemplified on FIG. 21 where the user is first guided with AR to find one place of interest for authentication, here the bar code area. It is also shown on the example that if the system fails to authenticate the drug pack with the barcode, before reporting to user a low probability of genuine origin, the apparatus may guide the user toward another are of interest like 2021 where the batch code appears. This can greatly help reducing the amount of reference image to compare to.

Figure 11B:
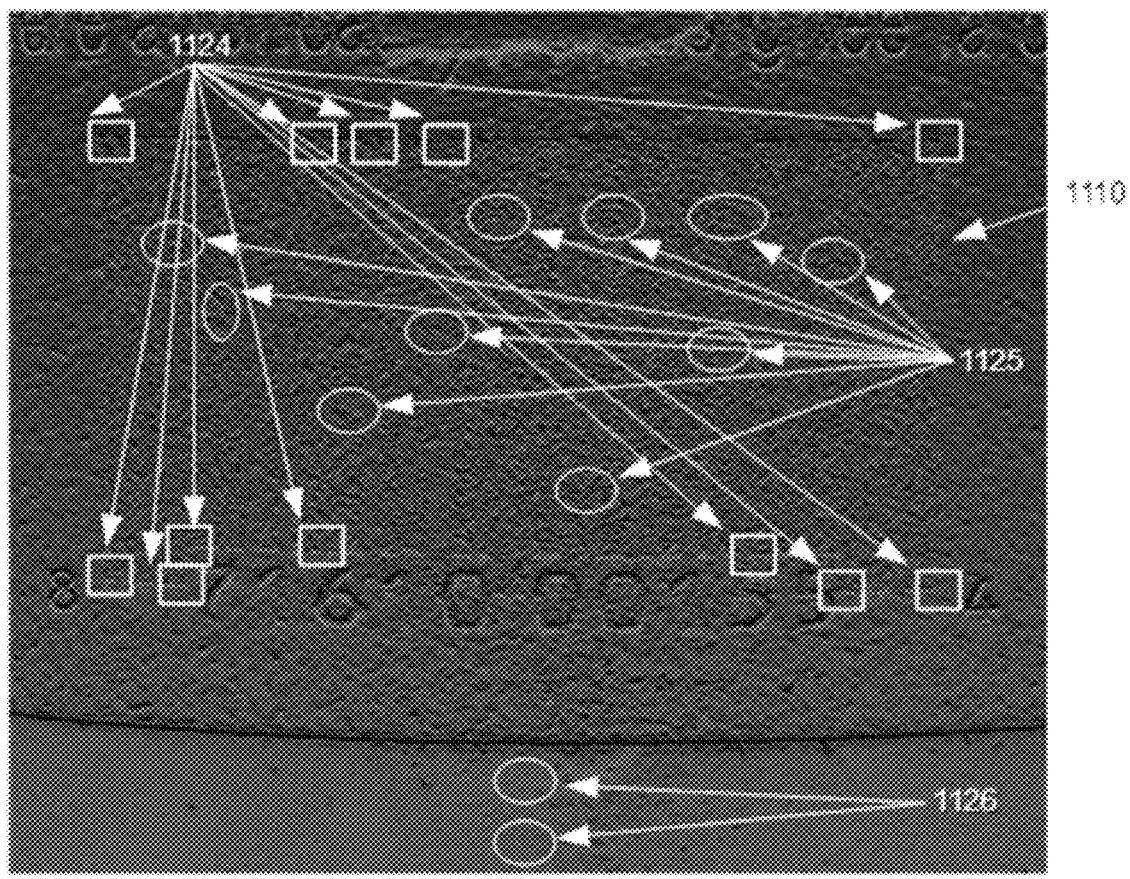
FIG. 11b is a gradient image of FIG. 11a over a small amount of pixels in which luminance is neutralized to enhance high frequencies.

In the case of bar code area, the bar code is an additional source of information as it can identify the product uniquely reducing dramatically the search for identification in the database, simultaneously the orientation and aspect of bar code allow to correct the image hence readjust the distribution of frequencies on an image that are distorted like the barrel effect shown on a bottle. This is helpful to readjust image pickup perspective and field taken image pickup. It can be noted on FIG. 11b that in 1126 the chaos that are part of the glass molding irregularities are of high interest as they can be part of the chaotic feature set hence certify that not only the label is genuine but belonging to the proper content. The picture in FIG. 11b is taken with a smartphone Samsung Galaxy SIV Mini® with a standard camera and no add-on of any kind.

Authorized Dealer Adjustments

In an embodiment, it is possible to grant licensed and trusted dealer the authority to test the products before displaying them for sale and the authority to add pictures of the product should the server return a negative response or a positive response which is inconsistent.

The re-registration can then be organized locally under surveillance from manufacturer, otherwise the goods may be returned to the plant for verification and/or registration.

Figure 10:
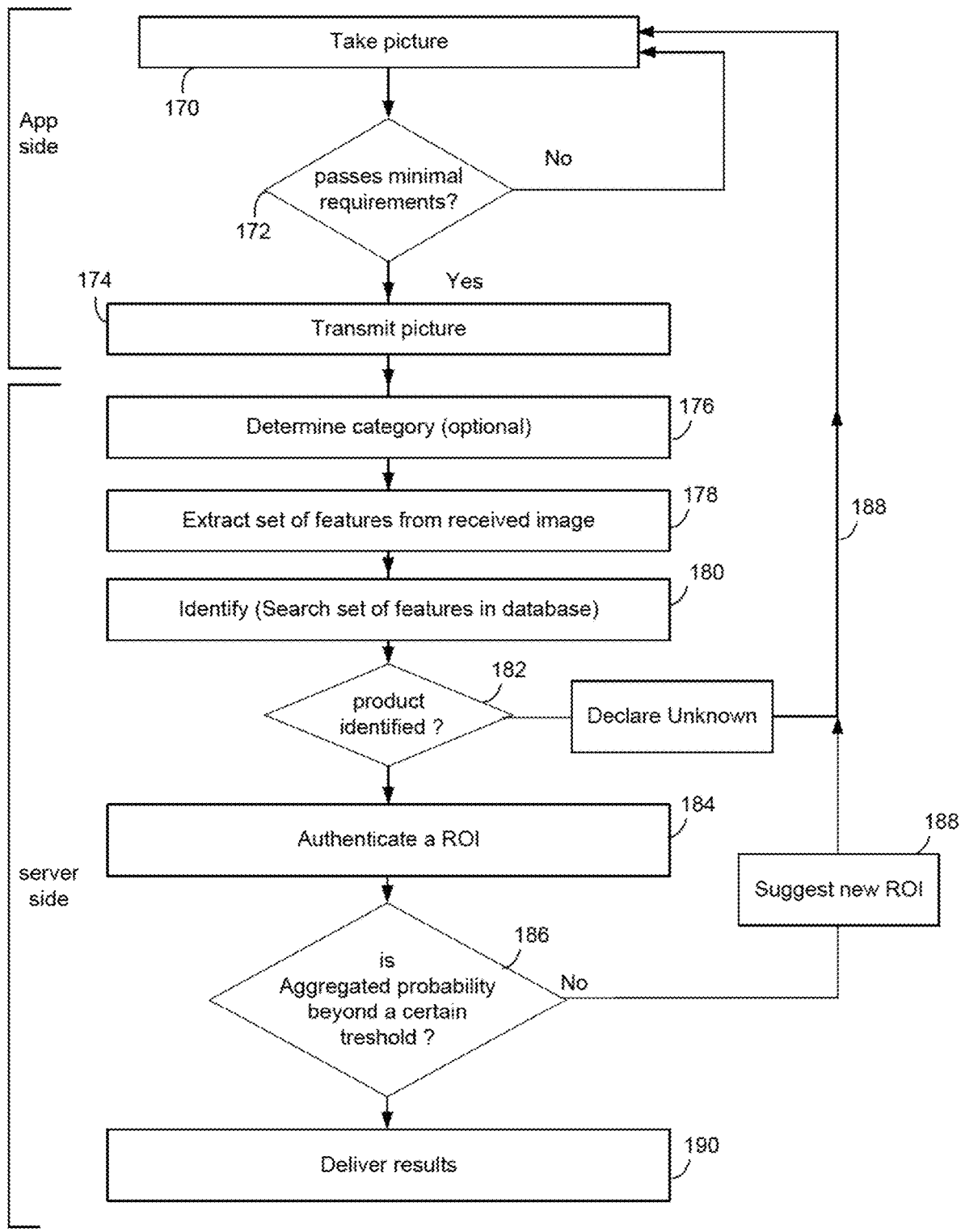
FIG. 10 is a general flowchart of the workflow between the app and the server, in accordance with an embodiment.

FIG. 10 is a general flowchart of the workflow between the app and the server, in accordance with an embodiment.

Steps 170-174 take place at the app (portable computing device). Step 170 comprises taking a picture of the product that need to be verified. At step 172 the app assesses the minimal requirements of the picture taken at 170. If they are ok the picture is transmitted to the server at step 174 otherwise a new picture is taken (with or without guidance).

Step 176 and up take place at the server side. At step 176 the server determines the category (product line) of the product shown in the received picture. The received may then be processed to extract a set of features. In an embodiment, the set of features may be extracted using the same rules and algorithms used at the product registration step when the images of the authentic products are processed to extract/find the chaotic signature. At step 180 the extracted feature set is searched in the database to find a match. At step 182 the results of searching the different features are identified through their features set (image descriptors like GIST this is Phase 2.1. Then user pickup, or server focus itself on a ROI for authentication at step 184.

If, at step 186, the combined probability is beyond a certain threshold the results are delivered at step 190. Otherwise, the server may request a new picture at step 188 and suggest a different location for the potential ROI and send the same back to the app for taking the new picture at the specified location. The experience is repeated if necessary at step 188, result of step 184 being kept for aggregation until all location of the set of known place of ROI for this identified product are scanned, or earlier if the aggregated probability reached the required threshold of accuracy.

Figure 31:
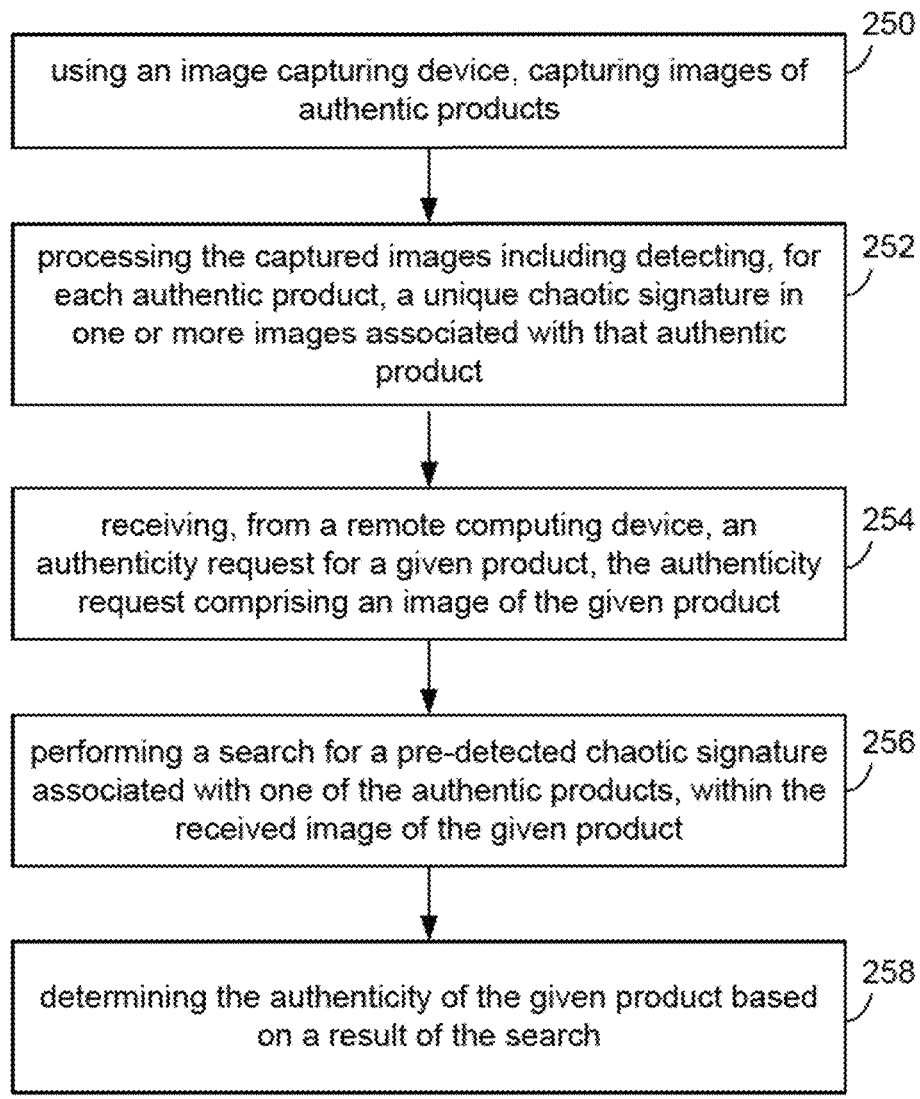
FIG. 31 is flowchart of a method for determining the authenticity of products, in accordance with an embodiment.

FIG. 31 is flowchart of a method for determining the authenticity of products, in accordance with an embodiment. The method begins at step 250 by capturing images of authentic products using an image capturing device. Step 252 comprises processing the captured images including detecting, for each authentic product, a unique chaotic signature in one or more images associated with that authentic product. Step 254 comprises receiving, from a remote computing device, an authenticity request for a given product, the authenticity request comprising an image of the given product. Step 256 comprises performing a search for a pre-detected chaotic signature associated with one of the authentic products, within the received image of the given product. Step 258 comprises determining the authenticity of the given product based on the result of the search.

Figure 32:
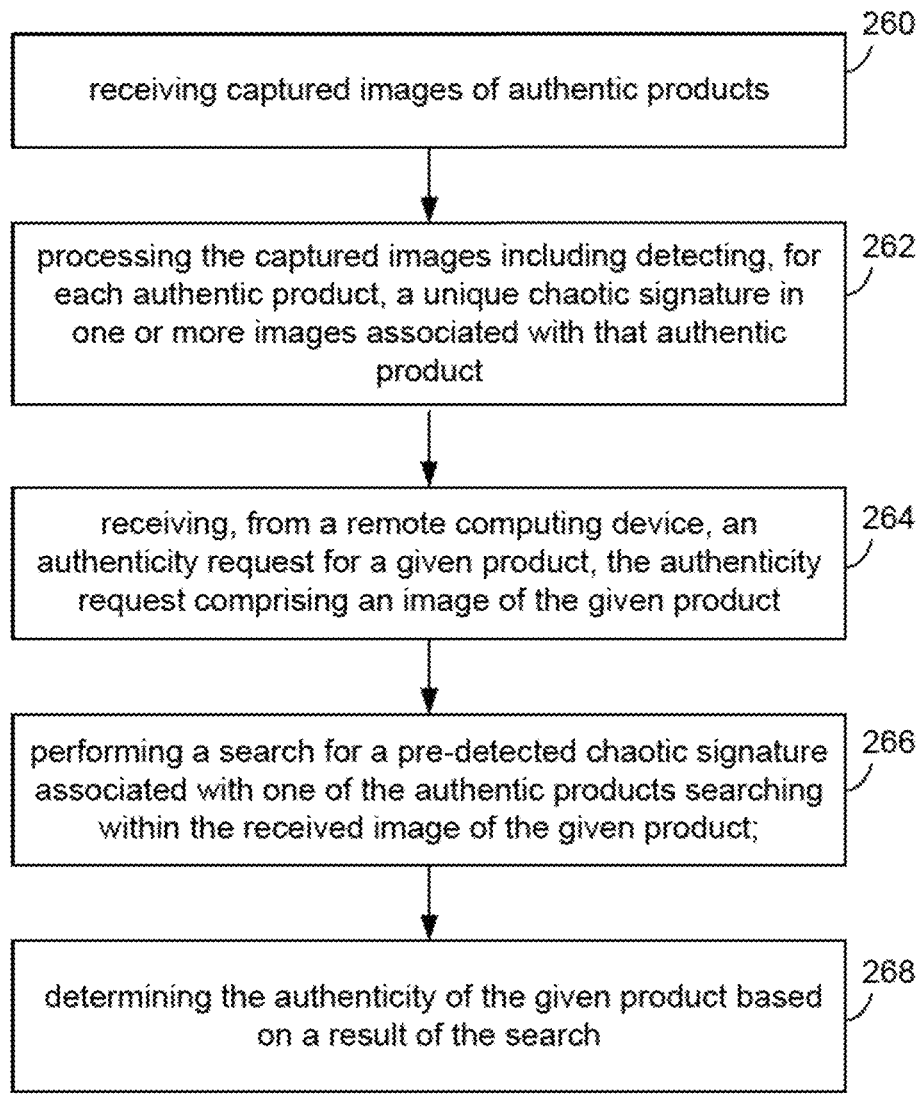
FIG. 32 is flowchart of a method for determining the authenticity of products, in accordance with another embodiment.

FIG. 32 is flowchart of a method for determining the authenticity of products, in accordance with another embodiment. The method comprises receiving captured images of authentic products at step 260. Step 262 comprises processing the captured images including detecting, for each authentic product, a unique chaotic signature in one or more images associated with that authentic product. Step 264 comprises receiving, from a remote computing device, an authenticity request for a given product, the authenticity request comprising an image of the given product. Step 266 comprises performing a search for a pre-detected chaotic signature associated with one of the authentic products searching within the received image of the given product. Step 268 comprises determining the authenticity of the given product based on the result of the search.

While preferred embodiments have been described above and illustrated in the accompanying drawings, it will be evident to those skilled in the art that modifications may be made without departing from this disclosure. Such modifications are considered as possible variants comprised in the scope of the disclosure.

For example, the process described above is not limited to chaotic signatures and can be applied to characterize human applied signatures that can be of a non-chaotic nature but rather extremely difficult to reproduce, example of such can be inclusion of metallic structures buried within another metallic object, where X ray may show the pattern. In which case, the manufacturing process may be complexified to a level where it becomes deterrent to produce a fake product. When the chaotic nature is difficult to assert then it can be created on purpose and even contain a method that allow an identification of the product, an example of a technology that can be combined is offered by "Stealth Mark" which delivers a product where the dispersion of grain is chaotic, whereas the detection of the product does not involve an authentication but rather an identification.

The invention claimed is:

1. A computer-implemented method for determining the authenticity of products, the method comprising:
    a registration phase that includes:
        receiving images of authentic products, at a server;
        detecting anchor points present in one or more of the images of every one of the authentic products, the anchor points existing at common geographical locations between the images of the authentic products in a given category of the authentic products;
        processing the images at the server including searching for and detecting, for each authentic product, a unique chaotic signature in one or more of the images associated with each authentic product, the server configured to analyze the images of the authentic products in search for the unique chaotic signature that uniquely identifies the authentic product with respect to the other authentic products, the unique chaotic signature naturally existing in the authentic product without adding or affixing material onto the authentic product;
        for each authentic product, measuring relative positions between the unique chaotic signature and one or more of the anchor points, the relative positions including a distance and an angle between the unique chaotic signature and each anchor point;
        storing the anchor points and the unique chaotic signatures associated with the authentic products and the relative positions associated with each unique chaotic signature in a database; and an authentication phase that includes:
receiving at the server, an authenticity request for a given product from a remote computing device, the authenticity request comprising an image of the given product;
performing a search within the image of the given product for one or more of the anchor points and the unique chaotic signature within the relative positions of the one or more anchor points;
determining that the given product is authentic if the unique chaotic signature found in the image of the given product matches one of the chaotic signatures stored in the database.

2. The method of claim 1, wherein determining that the given product is authentic comprises comparing the unique chaotic signature of the given product to the unique chaotic signatures of a sub-group of the authentic products stored in the database.

3. The method of claim 1, wherein performing the search within the image of the given product comprises using a hardware accelerator built with a pattern analyzer embedded with a hardware video encoder.

4. The method of claim 3, further comprising aggregating motion estimation vectors to create a final score to determine the authenticity of the given product based on a sum of normals of the vectors of the motion estimator.

5. The method of claim 1, further comprising finding, in a frequency transformation of a given image of an authentic product designated nodes of a first lattice found in the given image of the authentic product;
finding an entry point in a second lattice found in the given image,
travelling a given path of the second lattice for a given distance;
if a node is not found within the given distance, a direction of travel is changed to explore other parts of the second lattice until a number of nodes is found in the given image which match with the designated nodes of the given image of the authentic product in position and length of path between nodes.

6. The method of claim 1, further comprising requesting another image of the given product from the remote computing device.

7. The method of claim 1, further comprising:
identifying at least one region of interest (ROI) within the image of the given product;
requesting a close-up image of the ROI from the remote computing device; and
searching within the close-up image for the unique chaotic signature associated with the given product.

8. The method of claim 7, wherein identifying the ROI comprises:
processing the image of the given product using a set of rules used to find the unique chaotic signature in the images stored in the database; and
estimating a potential location of the unique chaotic signature of the given product, the potential location representing the ROI.

9. The method of claim 7, wherein identifying the ROI is done based on statistical information relating to locations of the unique chaotic signatures in a given line of products.

10. The method of claim 1, further comprising:
classifying the images of the authentic products into one or more product-lines;
detecting a product-line associated with the given product shown in the image of the given product; and
searching, within the image of the given product, for the unique chaotic signature associated with authentic products pertaining only to the detected product-line.

11. The method of claim 1, further comprising:
providing a QPR matrix defining an aperture on the given product; and
providing visual access to the unique chaotic signature of the given product through the aperture of the QPR matrix such that the QPR matrix surrounds the unique chaotic signature of the given product.

12. The method of claim 1, further comprising:
providing a QPR matrix defining an aperture on a package containing the given product, wherein the package contains a visual access to an area of the given product containing the unique chaotic signature of the given product; and
providing visual access to the unique chaotic signature of the given product through the aperture of the QPR matrix such that the QPR matrix surrounds the unique chaotic signature of the given product.

13. The method of claim 1, wherein the unique chaotic signatures are the result of a manufacturing process, a process of nature, or both thereof.

14. The method of claim 1, wherein the registration phase occurs at a plant where the authentic products are manufactured, or at a licensed dealer.

15. The method of claim 1, wherein detecting the unique chaotic signature of each authentic product comprises performing a progressive targeting of at least one of the images to find an area of interest where a frequency dispersion is optimal.

16. A computer-implemented method for determining the authenticity of products, the method comprising:
a registration phase that includes:
receiving, at a server, captured images of authentic products;
detecting anchor points present in one or more of the captured images of every one of the authentic products, the anchor points existing at common geographical locations between the images of the authentic products in a given category of the authentic products;
storing the detected anchor points;
processing the captured images at the server including detecting and storing in a database, for each authentic product, a unique chaotic signature in one or more of the images associated with each authentic product, the server configured to analyze the captured images of the authentic products in search for the unique chaotic signature that uniquely identifies the authentic product with respect to the other authentic products, the unique chaotic signature naturally existing in the authentic product without adding or affixing material onto the authentic products;
for each authentic product, measuring relative positions between the unique chaotic signature and two or more of the anchor points, the relative positions including at least one of a distance and an angle between the unique chaotic signature and each anchor point; and
an authentication phase that includes:
receiving, at the server, an authenticity request for a given product from a remote computing device, the authenticity request comprising an image of the given product;

performing a search within the image of the given product for the anchor points and the unique chaotic signature within the relative positions of the anchor points;

determining that the given product is authentic if the unique chaotic signature found in the image of the given product matches one of the unique chaotic signatures stored in the database.

17. The method of claim 16, wherein detecting the unique chaotic signature of each authentic product comprises performing a progressive targeting of at least one of the images to find an area of interest where a frequency dispersion is optimal.

18. A memory device having recorded thereon non-transitory computer readable instructions for determining the authenticity of products, the instructions when executed by a computer cause the computer to:

perform a registration phase that includes:
receive and process images of authentic products including detecting, for each authentic product, anchor points present in one or more of the images of every one of the authentic products, the anchor points existing at common geographical locations between the images of the authentic products in a given category of the authentic products, and a unique chaotic signature in one or more of the images associated with each authentic product, the computer configured to analyze the images of the authentic products in search for the unique chaotic signature that uniquely identifies the authentic product with respect to the other authentic products, the unique chaotic signature naturally existing in the authentic product without adding or affixing material onto the authentic product;

measure relative positions between the unique chaotic signature and two or more anchor points, the relative positions including at least one of a distance and an angle between the unique chaotic signature and each anchor point;

store the anchor points, the unique chaotic signatures of the authentic products and the relative positions associated with each unique chaotic signature and the anchor points in a database; and perform an authentication phase that includes:
receive, from a remote computing device, an authenticity request for a given product, the authenticity request comprising an image of the given product;

search within the image of the given product for the anchor points and unique chaotic signatures within the relative positions of the anchor points; and determine that the given product is authentic if the unique chaotic signature found in the image of the given product matches one of the unique chaotic signatures stored in the database.

19. A computing device having access to a memory having recorded thereon computer readable code for determining the authenticity of products, the code when executed by a processor of the computing device causes the computing device to:

perform a registration phase that includes:
receive and process images of authentic products including detecting, for each authentic product, anchor points present in one or more of the images of every one of the authentic products, the anchor points existing at common geographical locations between the images of the authentic products in a given category of the authentic products, and a unique chaotic signature in one or more images associated with that authentic product, the computing device configured to analyze the images of the authentic products in search for the unique chaotic signature that uniquely identifies the authentic product with respect to the other authentic products, the unique chaotic signature naturally existing in the authentic product without adding or affixing material onto the authentic product;

measure relative positions between the unique chaotic signature and two or more anchor points, the relative positions including at least one of a distance and an angle between the unique chaotic signature and each anchor point;

store the anchor points, the unique chaotic signatures of the authentic products and the relative positions associated with each unique chaotic signature and the anchor points in a database; and perform an authentication phase that includes:
receive, from a remote computing device, an authenticity request for a given product, the authenticity request comprising an image of the given product;

search within the image of the given product for the anchor points and unique chaotic signatures within the relative positions of the anchor points; and determine that the given product is authentic if the unique chaotic signature found in the image of the given product matches one of the unique chaotic signatures stored in the database.

20. The computing device of claim 19, wherein the computing device is adapted to request another image of the given product from the remote computing device.

21. The computing device of claim 19, wherein the computing device is adapted to:
identify a region of interest (ROI) within the image of the given product;
request a close-up image of the ROI from the remote computing device;
search within the close-up image for the unique chaotic signature associated with the given product.

22. The computing device of claim 21, wherein the computing device is adapted to process the image of the given product using a set of rules used to find the unique chaotic signature in the images stored in the database; and estimate a potential location of the unique chaotic signature of the given product, the potential location representing the ROI.

23. The computing device of claim 21, wherein the ROI is identified based on statistical information relating to locations of the unique chaotic signatures in a given line of products.

24. The computing device of claim 19, wherein the computing device is adapted to:
classify the images of the authentic products into one or more product-lines;
detect a product-line associated with the given product shown in the image of the given product; and
search, within the image of the given product, for the unique chaotic signature associated with authentic products pertaining only to the detected product-line.

25. The computing device of claim 19, wherein the computing device is adapted to search for the unique chaotic signature of the given product in a QPR matrix defining an aperture providing visual access to the unique chaotic signature of the given product.

26. The computing device of claim 19, wherein detecting the unique chaotic signature of each authentic product comprises performing a progressive targeting of at least one of the images to find an area of interest where a frequency dispersion is optimal.

* * * * *